United States Patent
Choltco-Devlin et al.

(10) Patent No.: US 10,258,202 B2
(45) Date of Patent: Apr. 16, 2019

(54) COCKTAIL SHAKER AND TOOL ASSEMBLY AND METHOD OF USING SAME

(71) Applicant: Pacific Market International, LLC, Seattle, WA (US)

(72) Inventors: Evan Choltco-Devlin, Ellensburg, WA (US); Jake Silsby, Seattle, WA (US)

(73) Assignee: PACIFIC MARKET INTERNATIONAL, LLC, Seattle, WA (US)

( * ) Notice: Subject to any disclaimer, the term of this patent is extended or adjusted under 35 U.S.C. 154(b) by 167 days.

(21) Appl. No.: 15/001,719

(22) Filed: Jan. 20, 2016

(65) Prior Publication Data

US 2017/0202400 A1    Jul. 20, 2017

(51) Int. Cl.
| | |
|---|---|
| *A47J 43/27* | (2006.01) |
| *A47J 19/02* | (2006.01) |
| *B65D 47/12* | (2006.01) |

(52) U.S. Cl.
CPC .............. *A47J 43/27* (2013.01); *A47J 19/022* (2013.01); *B65D 47/12* (2013.01)

(58) Field of Classification Search
CPC .......... A47J 43/27; A47J 19/022; B65D 47/12
See application file for complete search history.

(56) References Cited

U.S. PATENT DOCUMENTS

| | | | | |
|---|---|---|---|---|
| 1,509,981 A | * | 9/1924 | Rice | A47J 19/022 99/508 |
| 1,585,524 A | * | 5/1926 | Bass | B65D 7/24 220/212 |
| 1,661,336 A | * | 3/1928 | Katz | A47J 43/27 206/217 |

(Continued)

FOREIGN PATENT DOCUMENTS

| | | | |
|---|---|---|---|
| DE | 3035014 | * | 4/1982 |
| DE | 10102167 | * | 8/2002 |

(Continued)

OTHER PUBLICATIONS https://www.stanley-pmi.com/shop/adventure-happy-hour-2x-system, Stanley, 2015.

(Continued)

*Primary Examiner* — Anthony J Weier
(74) *Attorney, Agent, or Firm* — Davis Wright Tremaine LLP; Heather M. Colburn; George C. Rondeau, Jr.

(57) ABSTRACT

An assembly including a vessel, lid, citrus reamer, and cap. The lid is configured to engage the vessel in both first and second orientations. The citrus reamer is removably couplable to the lid in both storage and use orientations. The cap is removably attachable to the lid. The vessel, the lid in the first orientation, the citrus reamer (in either the use or storage orientations), and the cap are removably couplable together to form a kit assembly. The vessel, the lid in the first orientation, and the cap are removably couplable together to form a cocktail shaker. The vessel, the lid in the second orientation, and the citrus reamer in the use orientation are removably couplable together to form a first juicing assembly. Cups may be removably housed inside the vessel. One of the cups and the citrus reamer may be removably coupled together to form a second juicing assembly.

39 Claims, 15 Drawing Sheets

(56) References Cited

U.S. PATENT DOCUMENTS

| | | | | |
|---|---|---|---|---|
| 1,971,657 A | * | 8/1934 | Quam | A47J 19/022 99/485 |
| 1,996,970 A | * | 4/1935 | Morris | A47J 19/022 100/133 |
| 2,019,535 A | * | 11/1935 | Herr | A47J 19/022 220/568 |
| 2,026,918 A | * | 1/1936 | Streckfuss | A47J 19/02 99/503 |
| 2,081,424 A | * | 5/1937 | Daum | A47J 19/022 99/507 |
| 2,087,979 A | * | 7/1937 | Kennedy | A47J 19/022 99/505 |
| D107,781 S | | 1/1938 | Mackelfresh, Jr. | |
| 2,328,543 A | * | 9/1943 | Bauman | A45F 3/20 206/217 |
| 2,500,611 A | * | 3/1950 | Kereluck | A47J 19/022 220/212 |
| 2,535,553 A | * | 12/1950 | Stoner | A47J 19/022 100/130 |
| D202,119 S | | 8/1965 | Shelby | |
| 4,125,064 A | * | 11/1978 | Ackeret | A47J 19/022 99/508 |
| D341,960 S | | 12/1993 | Iannuzzelli et al. | |
| 6,070,519 A | * | 6/2000 | Sham | A47J 19/02 99/348 |
| D527,583 S | | 9/2006 | Freeman | |
| D529,340 S | | 10/2006 | Laib et al. | |
| D610,873 S | | 3/2010 | Wingfield et al. | |
| D626,829 S | | 11/2010 | Touchet | |
| D672,618 S | | 12/2012 | Stamper et al. | |
| D683,590 S | | 6/2013 | Austin | |
| D690,162 S | | 9/2013 | Staton | |
| D693,673 S | | 11/2013 | de Witte et al. | |
| D714,098 S | | 9/2014 | Zollweg et al. | |
| D721,541 S | | 1/2015 | Evans | |
| D733,497 S | | 7/2015 | Sorensen et al. | |
| D744,279 S | | 12/2015 | Arciero | |
| D751,343 S | | 3/2016 | Chen et al. | |
| 9,314,089 B2 | | 4/2016 | Hodge et al. | |
| D775,892 S | | 1/2017 | Smith | |
| D788,527 S | | 6/2017 | Smith et al. | |
| D793,227 S | | 8/2017 | Maskell | |
| D798,112 S | | 9/2017 | Godsey | |
| D804,910 S | | 12/2017 | Steel et al. | |
| D805,354 S | | 12/2017 | Bielawski | |
| D828,097 S | | 9/2018 | Silsby | |
| 2003/0075057 A1 | * | 4/2003 | Saunders | A47J 19/02 99/495 |
| 2008/0196602 A1 | * | 8/2008 | Sands | A47J 19/027 99/513 |
| 2010/0058941 A1 | * | 3/2010 | Rivera | A47J 19/02 99/513 |
| 2012/0103203 A1 | * | 5/2012 | Hensel | A47J 19/02 99/504 |
| 2014/0227416 A1 | * | 8/2014 | Chitayat | A23L 2/04 426/489 |
| 2018/0070761 A1 | | 3/2018 | Sedlacek et al. | |

FOREIGN PATENT DOCUMENTS

| | | | |
|---|---|---|---|
| GB | 268978 | * | 4/1927 |
| GB | 673137 | * | 6/1952 |

OTHER PUBLICATIONS

Notice of Allowance, dated Oct. 17, 2018, received in Design U.S. Appl. No. 29/629,674.

* cited by examiner

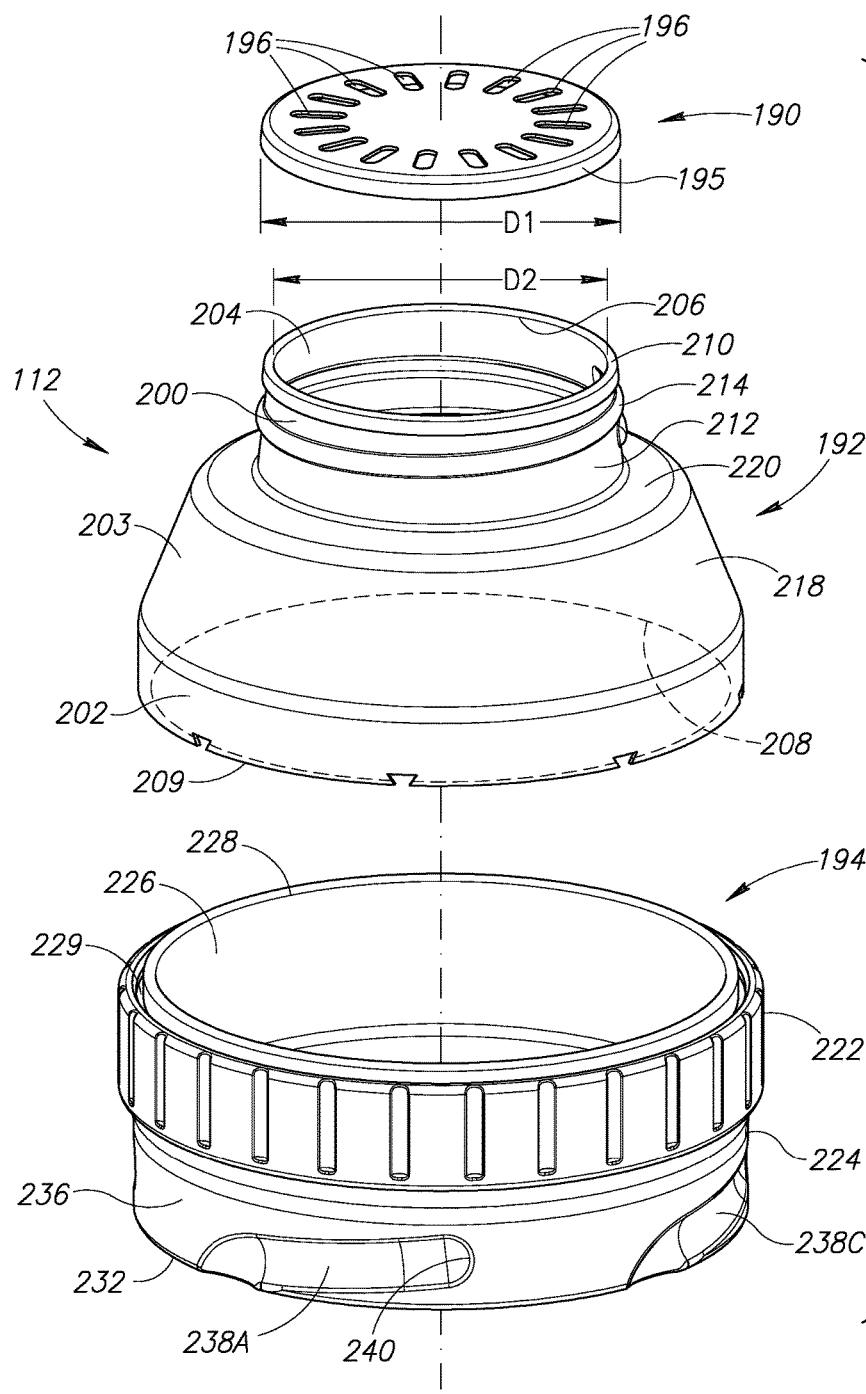

COCKTAIL SHAKER AND TOOL ASSEMBLY AND METHOD OF USING SAME

BACKGROUND OF THE INVENTION

Field of the Invention

The present invention is directed generally to tools and containers, such as cocktail shakers, used to prepare and serve cocktails and/or mixed drinks.

Description of the Related Art

Making some mixed drinks or cocktails requires the use of multiple tools and/or containers. For example, many cocktails require a cocktail shaker in addition to a cup in which to serve the drink. Some cocktails require fresh fruit. For example, at least two cocktails, commonly referred to as a "lemon drop" and a "snakebite," require freshly squeezed citrus juice. While different people may use different recipes, a lemon drop cocktail typically includes freshly squeezed lemon juice, vodka, sugar, and ice. These ingredients are combined in a cocktail shaker, which is shaken to mix the ingredients together. After the mixture has been shaken, the mixture is poured into one or more cups or glasses and served. Optionally, the drink may be garnished with one or more lemon slices.

Unfortunately, making cocktails involves collecting and using multiple tools and/or containers. This is particular problematic if these tools and/or containers must be transported. Therefore, a need exists for new tools and/or containers configured to make cocktails and/or mixed drinks. Tools and/or containers that are easily transported are particularly desirable. The present application provides these and other advantages as will be apparent from the following detailed description and accompanying figures.

BRIEF DESCRIPTION OF THE SEVERAL VIEWS OF THE DRAWING(S)

FIG. 7 is an exploded perspective view of the lid of the assembly of FIG. 1.

DETAILED DESCRIPTION OF THE INVENTION

Figure 1:
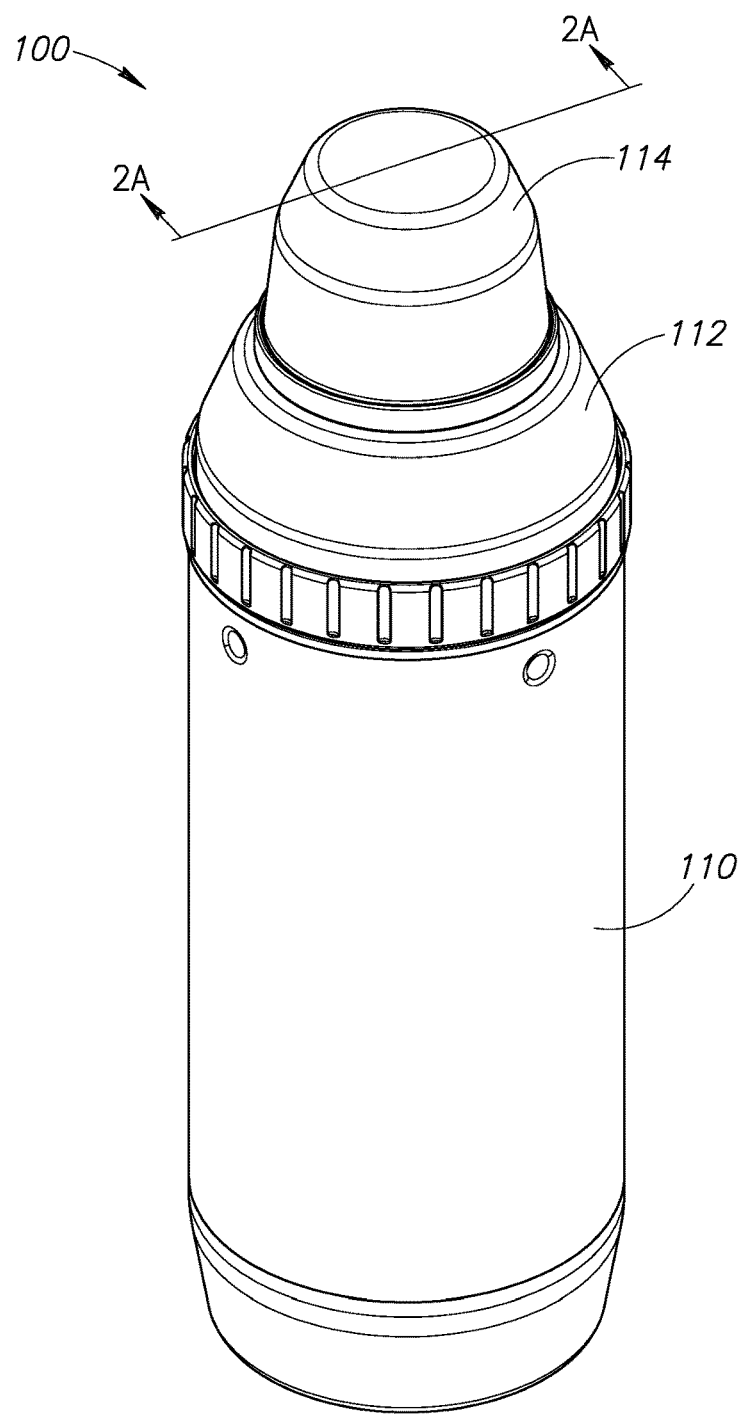
FIG. 1 is a perspective view of a first embodiment of a cocktail shaker and tool assembly that includes a vessel, a lid, a citrus reamer, a cap, and a plurality of cups.
Figure 2A:
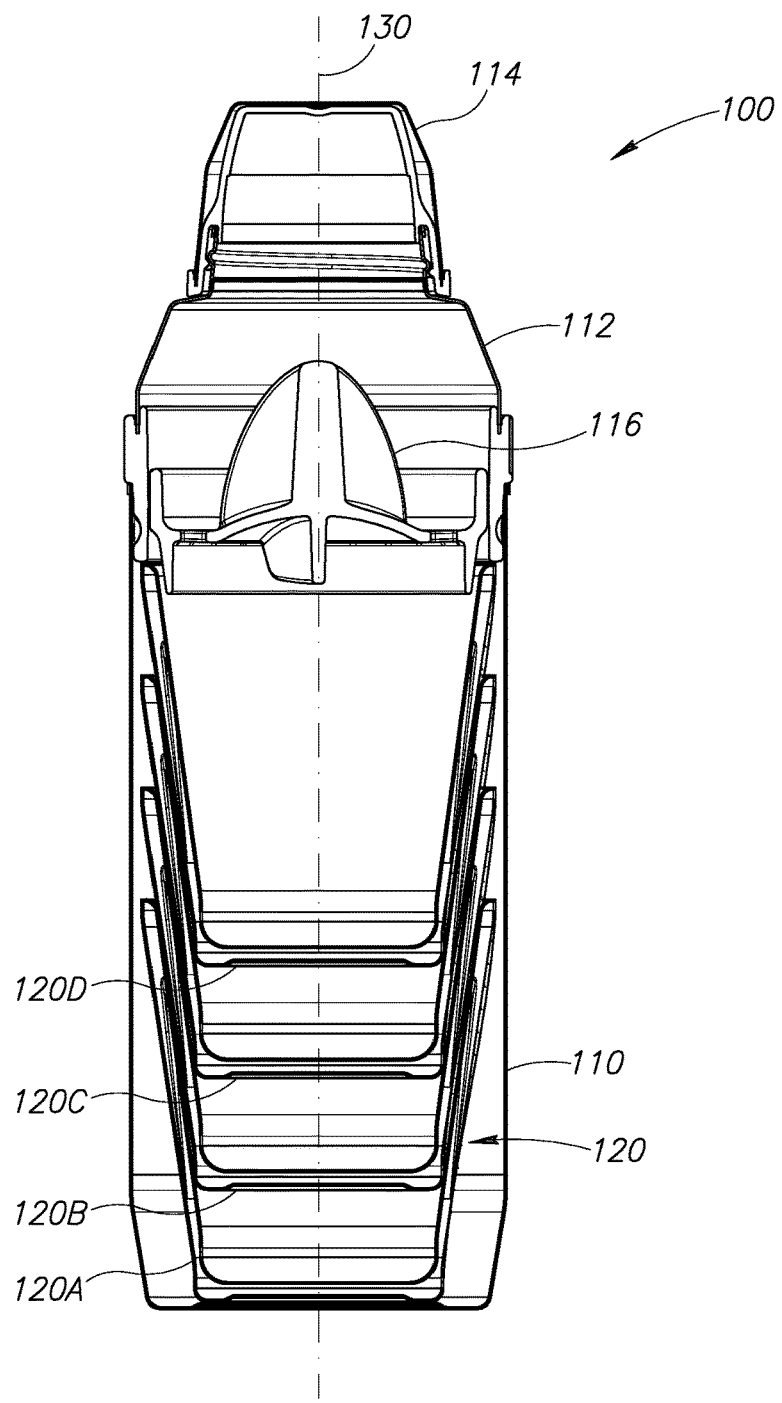
FIG. 2A is a cross-sectional view of the assembly of FIG. 1 taken through a line 2A-2A shown in FIG. 1.
Figure 2B:
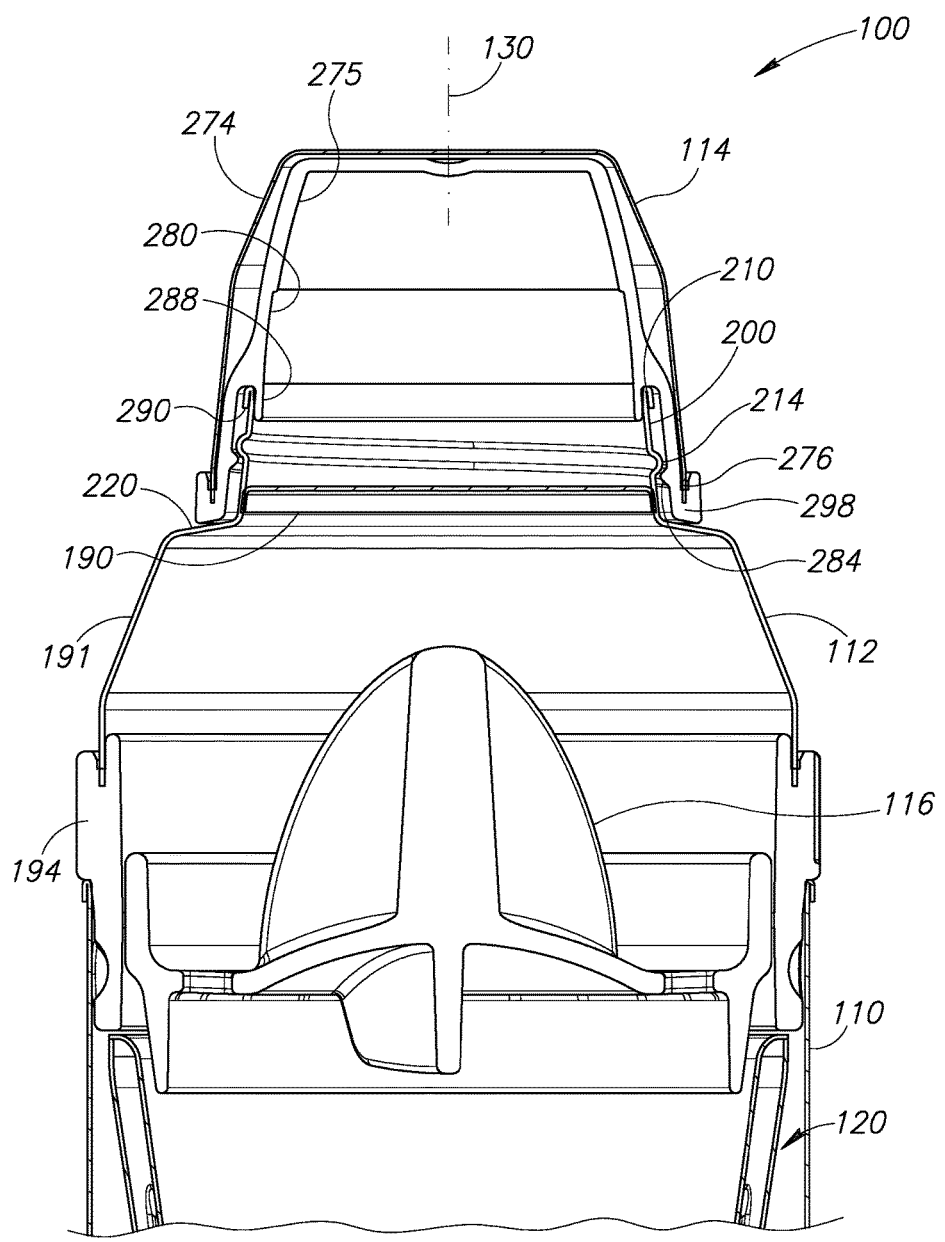
FIG. 2B is an enlargement of an upper portion of FIG. 2A.
Figure 3:
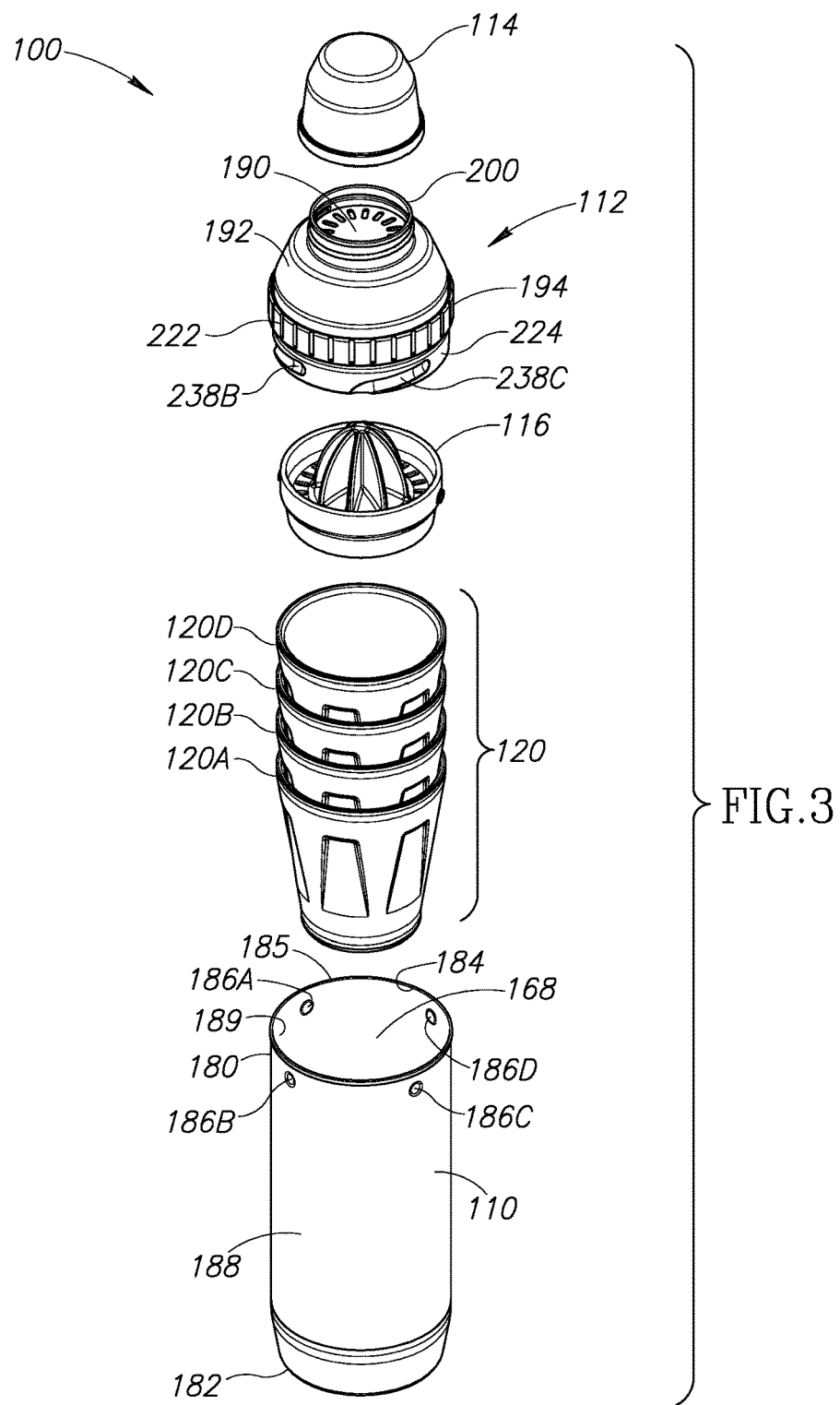
FIG. 3 is a partially exploded perspective view of the assembly of FIG. 1.

FIG. 1 is a perspective view of a first embodiment of a cocktail shaker and tool assembly 100, FIG. 2A is a cross-sectional view of the assembly 100, FIG. 2B is an enlargement of a section of FIG. 2A, and FIG. 3 is a partially exploded perspective view of the assembly 100. In FIGS. 1-2B, the components of the assembly 100 are illustrated assembled for storage and/or transport. As will be explained below, the components of the assembly 100 may be used to prepare one or more different mixed drinks or cocktails.

Referring to FIG. 2A, the assembly 100 includes a liquid tight cup-shaped vessel 110, a removable lid 112, a removable cap 114, a removable citrus reamer 116, and one or more removable cups 120. For ease of illustration, the vessel 110 will be described as having a longitudinal axis 130. As illustrated in FIG. 2A, in the assembly 100, the cup(s) 120 are housed inside the vessel 110, both the citrus reamer 116 and the cap 114 are coupled to the lid 112, and the lid 112 is coupled to the vessel 110. The lid 112 traps the cup(s) 120 inside the vessel 110. In the embodiment illustrated in FIGS. 2A and 3, the cup(s) 120 include four different cups 120A-120D that may be nested together. However, this is not a requirement. The cup(s) 120 may be removed from the assembly 100 and used separately.

In the assembly 100, the citrus reamer 116 is coupled to the lid 112 in a storage orientation (also shown in FIGS. 2B, 3, 13, and 15) with respect to the lid 112. The citrus reamer 116 may alternatively be coupled to the lid 112 inside the assembly 100 in a use orientation (see FIG. 14) with respect to the lid 112. The citrus reamer 116 is transitioned between the storage and use orientations by decoupling the citrus reamer 116 from the lid 112, spacing the citrus reamer 116 from the lid 112, and rotating the citrus reamer 116 (e.g., 180°) with respect to the lid 112.

In the assembly 100, the lid 112 is engaged with (e.g., coupled to) the vessel 110 in an upright orientation (also shown in FIGS. 1, 2B, 3, 4, and 15) with respect to the vessel 110. Alternatively, the lid 112 may engaged with (e.g., place on) the vessel 110 in an inverted orientation (see FIGS. 5A and 5B) with respect to the vessel 110. The lid 112 is transitioned between the storage and use orientations by disengaging the lid 112 from the vessel 110, spacing the lid 112 from the vessel 110, and rotating the lid 112 (e.g., 180°) with respect to the vessel 110.

Figure 15:
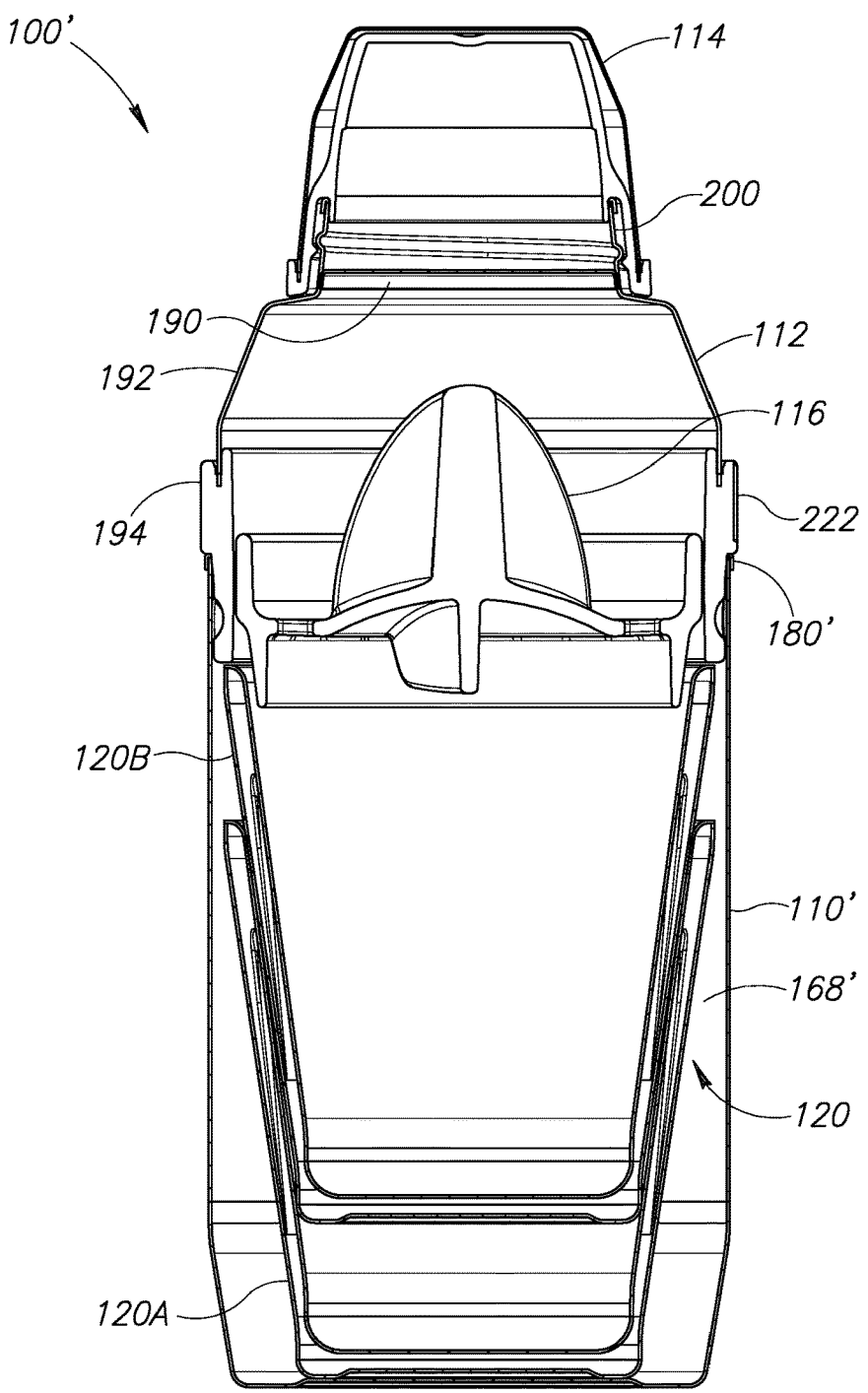
FIG. 15 is a perspective view of a second embodiment of a cocktail shaker and tool assembly.

FIG. 15 is a perspective view of a second embodiment of a cocktail shaker and tool assembly 100'. Like reference numerals have been used in the figures to identify like components of the assemblies 100' and 100 (see FIGS. 1-3). The assembly 100' is substantially identical to the assembly 100 but differs from the assembly 100 in two respects. First, the assembly 100' includes a vessel 110' instead of the vessel 110 (see FIGS. 1-3). The vessel 110' is substantially identical to the vessel 100 except, the vessel 110' is shorter than the vessel 110 along the longitudinal axis 130 (see FIGS. 2A, 2B, and 4). Second, because the vessel 110' is shorter, the vessel 110' is capable of housing fewer cups than the vessel 110. In the embodiment illustrated, the assembly 100' includes only the cups 120A and 120B. In other words, the cups 120C and 120D (see FIGS. 2A and 3) are omitted from the assembly 100'. The cups 120A and 120B are removable from the assembly 100' and usable separately.

The components of the assemblies 100 and 100' are configured to be selectively disassembled and assembled together to form a number of different useful subassemblies. In other words, the assemblies 100 and 100' may each be described as being a kit for constructing each of these different subassemblies. The subassemblies include at least a cocktail shaker subassembly 140 (see FIG. 4), a first juicing subassembly 150 (see FIGS. 5A and 5B), and a second juicing subassembly 160 (see FIGS. 6A and 6B). Because the assembly 100' is substantially identical to the assembly 100, for the sake of brevity, the subassemblies 140, 150, and 160 will be described below as being constructed from the components of the assembly 100. However, the subassemblies 140, 150, and 160 may alternatively be constructed from the components of the assembly 100' by simply substituting the vessel 110' of the assembly 100' for the vessel 110 of the assembly 100.

Cocktail Shaker Subassembly

Figure 4:
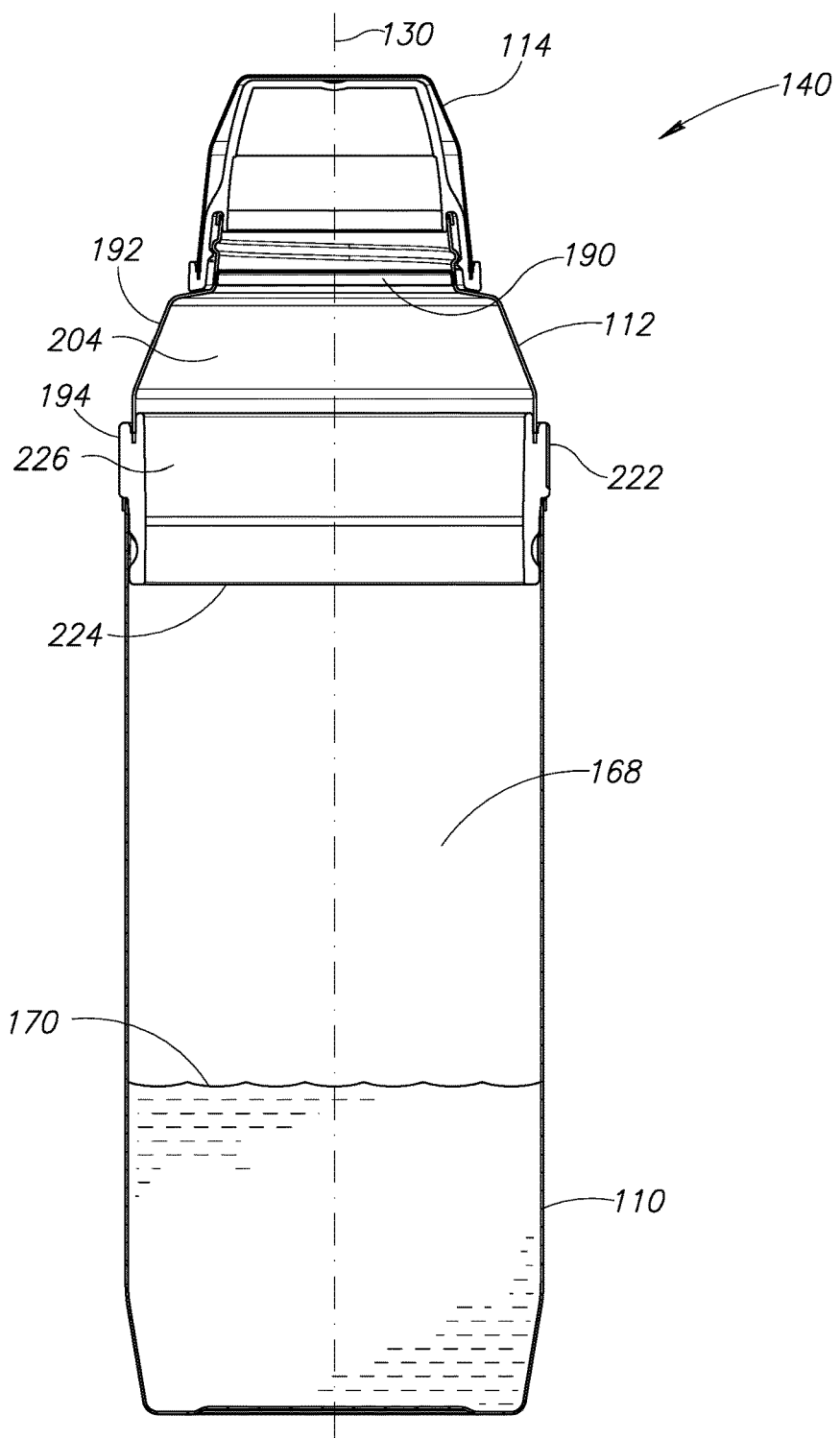
FIG. 4 is a cross-sectional view of a cocktail shaker subassembly constructed from the vessel, the lid, and the cap of the assembly of FIG. 1.

FIG. 4 is a cross-sectional view of the cocktail shaker subassembly 140. Referring to FIG. 4, the vessel 110, the lid 112 (in the upright orientation with respect to the vessel 110), and the removable cap 114 may be assembled to form the cocktail shaker subassembly 140. The cocktail shaker subassembly 140 provides the same functionality as a conventional cocktail shaker.

In the embodiment illustrated in FIG. 4, the cocktail shaker subassembly 140 omits the citrus reamer 116 (see FIGS. 2A-3, 5A-6B, and 11-15) and the cup(s) 120 (see FIGS. 2A-3 and 15). Optionally, the citrus reamer 116 (see FIGS. 2A-3, 5A-6B, and 11-15) oriented in either the storage orientation (see FIGS. 2A-3, 13, and 15) or the use orientation (see FIGS. 5A, 5B, and 14) with respect to the lid 112 may be coupled to the lid 112 inside the cocktail shaker subassembly 140.

The lid 112 and the vessel 110 are rotatable with respect to one another. Likewise, the lid 112 and the vessel 110' (see FIG. 15) are rotatable with respect to one another. For the sake of brevity, whenever one of these components may be rotated with respect to the other to construct an assembly (e.g., the assembly 100 (see FIGS. 1-3), the assembly 100' (see FIG. 15), or the cocktail shaker subassembly 140) or to disassemble such an assembly, the lid 112 will be described as being rotated with respect to the vessel 110 (or the vessel 110'). However, in the alternative, the vessel 110 (or the vessel 110') may be rotated with respect to the lid 112, or the lid 112 and the vessel 110 (or the vessel 110') may both be rotated (in opposite directions) with respect to one another at the same time.

As mentioned above, the vessel 110' (see FIG. 15) is substantially identical to the vessel 100 except, the vessel 110' is shorter than the vessel 110 along the longitudinal axis 130 (see FIGS. 2A, 2B, and 4). Therefore, only the vessel 110 will be described in detail. Nevertheless, the vessel 110' includes substantially identical features and components that correspond to the features and components of the vessel 110 described below.

Referring to FIG. 4, the vessel 110 defines a fluid tight hollow interior 168 configured to house ingredients 170 (e.g., ingredients used to make cocktails). By way of non-limiting examples, the ingredients 170 may include one or more of the following: juice (e.g., a citrus juice 172 shown in FIG. 5B), alcoholic beverages, syrups, water, sugar, herbs, spices, sauces, coffee, ice, carbonated beverages, flavorings, and the like. A user 174 (see FIG. 5B) may shake the ingredients 170 inside the cocktail shaker subassembly 140 after the lid 112 (in the upright orientation with respect to the vessel 110) has been attached to the vessel 110, and the cap 114 has been attached to the lid 112. After the ingredients 170 have been shaken inside the cocktail shaker subassembly 140, the user 174 (see FIG. 5B) may remove the cap 114 from the lid 112 and pour the ingredients 170 from the vessel 110 through the lid 112 (e.g., into one or more of the cups 120 shown in FIGS. 2A-3 and 15).

Referring to FIG. 3, the vessel 110 has an open upper portion 180 opposite a closed base portion 182. The open upper portion 180 includes an opening 184 (into the interior 168) surrounded by an upper edge 185. At least some of the ingredients 170 (FIG. 4) may be placed inside the interior 168 of the vessel 110 through the opening 184. Near the opening 184, the upper portion 180 has inwardly extending projections 186A-186D. In the embodiment illustrated, the inwardly extending projections 186A-186D are depressions formed in an outside surface 188 of the vessel 110. The vessel 110 has an inside surface 189 that faces into the interior 168 opposite the outside surface 188.

Referring to FIG. 7, in the embodiment illustrated, the lid 112 has a three-part construction that includes a strainer 190, an upper lid portion 192, and a lower lid portion 194. The strainer 190 and the upper lid portion 192 may each be constructed from a rigid or durable material.

The strainer 190 may be substantially disk shaped and have a peripheral edge 195 that defines a substantially circular outer shape having an outer diameter "D1." The strainer 190 has a plurality of through-holes 196. In the embodiment illustrated, the through-holes 196 are spaced apart from the peripheral edge 195. Referring to FIG. 4, when the cocktail shaker subassembly 140 is fully assembled, the through-holes 196 (see FIG. 7) provide passages through the strainer 190.

Referring to FIG. 7, the upper lid portion 192 is substantially hollow and has an upper threaded portion 200 connected to an open lower portion 202 by an intermediate portion 203. An open ended inside channel 204 extends through the upper lid portion 192. Referring to FIG. 4, when the cocktail shaker subassembly 140 is fully assembled, the inside channel 204 is aligned with and extends along the longitudinal axis 130 of the vessel 110. Referring to FIG. 7, an upper opening 206 of the inside channel 204 is formed in the upper threaded portion 200, and a lower opening 208 of the inside channel 204 is formed in the lower portion 202. The upper threaded portion 200 has an upper edge 210 that surrounds the upper opening 206. The lower opening 208 is surrounded by a lower edge 209 formed in the lower portion 202. The upper threaded portion 200 has an outside surface 212 with outside threads 214 formed therein.

The upper opening 206 has an inner diameter "D2," defined by the upper edge 210 that is larger than the outer diameter "D1" of the strainer 190. The strainer 190, which is substantially disk shaped, may be inserted into the upper opening 206 and press fit into the upper threaded portion 200. In this manner, the strainer 190 extends across the channel 204 in the upper threaded portion 200. Friction between the upper threaded portion 200 and the peripheral edge 195 of the strainer 190 helps maintain the strainer 190 inside the upper lid portion 192. The strainer 190 may be permanently attached (e.g., welded) to the upper threaded portion 200 inside the channel 204. Thus, materials (e.g., the ingredients 170 illustrated in FIG. 4) flowing through the channel 204 toward the upper opening 206 will pass through the through-holes 196 of the strainer 190 and be strained thereby. In other words, the strainer 190 provides the same functionality as a conventional strainer of a conventional cocktail shaker, namely, straining undesired items (e.g., ice, seeds, and the like) from the ingredients 170 as the ingredients 170 flow out of the cocktail shaker subassembly 140.

The intermediate portion 203 has a tapered portion 218 that is connected to the upper threaded portion 200 by a shoulder portion 220. The lower portion 202 is wider than the upper threaded portion 200 and the tapered portion 218 is narrower near the upper threaded portion 200 and wider near the lower portion 202. The lower edge 209 of the lower portion 202 is attached to the lower lid portion 194 and forms a liquid tight seal therewith.

The lower lid portion 194 is constructed from a material configured to form fluid tight seals with both the upper portion 180 of the vessel 110 and the lower edge 209 of the upper lid portion 192. The lower lid portion 194 is generally ring shaped and has an upper grip portion 222 adjacent to a lower connector portion 224. A through-channel 226 extends through the lower lid portion 194. Referring to FIG. 4, when the cocktail shaker subassembly 140 is fully assembled, the through-channel 226 is aligned with and extends along the longitudinal axis 130 of the vessel 110.

Returning to FIG. 7, an upper opening 228 of the through-channel 226 is formed in the grip portion 222. An upwardly opening channel 229 is formed in the grip portion 222 surrounding the upper opening 228. The upwardly opening channel 229 is configured to receive the lower edge 209 of the upper lid portion 192 and form a liquid tight seal therewith. The lower edge 209 is attached to the lower lid portion 194 inside the channel 229. By way of a non-limiting example, the lower edge 209 may be press fit into the channel 229 or otherwise held in place by friction between the lower edge 209 the sidewalls of the channel 229. Optionally, an adhesive may be used to glue the lower edge 209 to the inside of the channel 229.

Figure 5A:
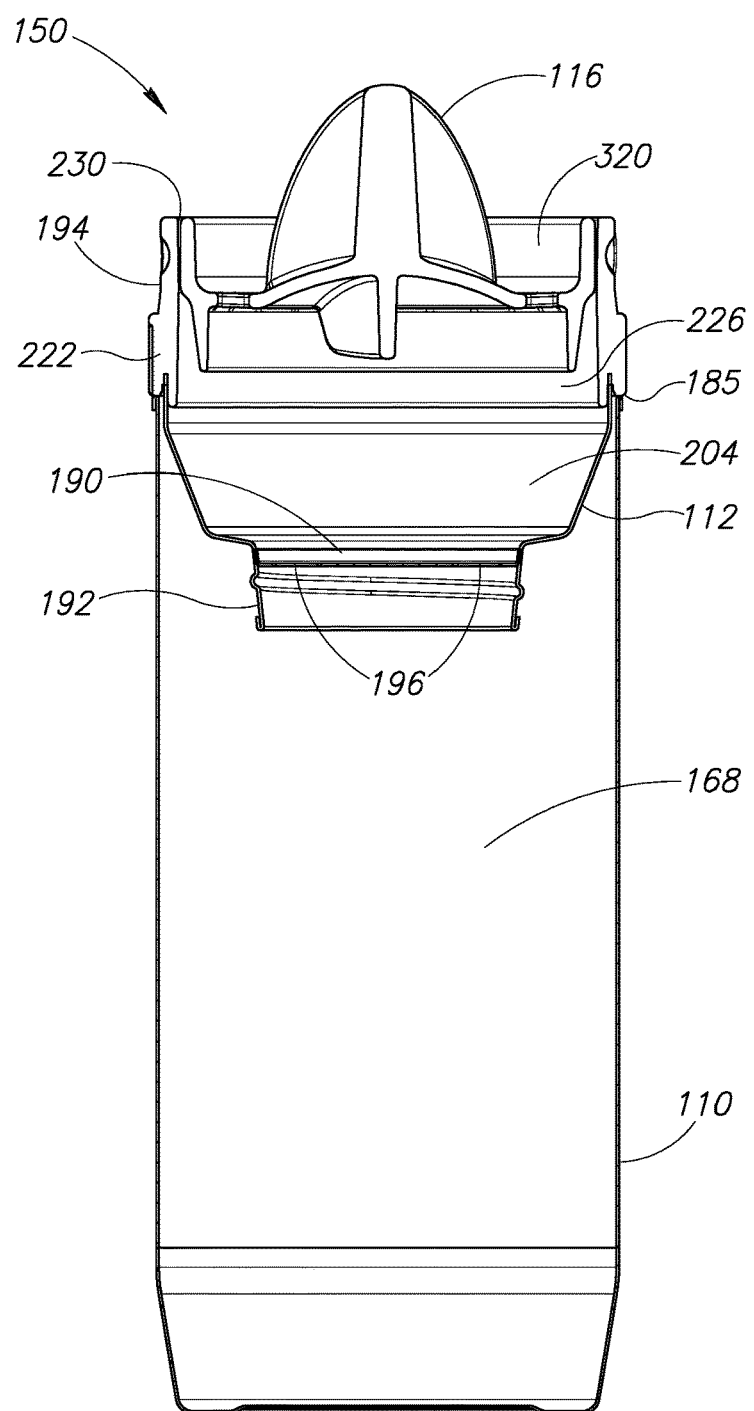
FIG. 5A is a cross-sectional view of a first juicing subassembly constructed from the vessel, the lid, and the citrus reamer of the assembly of FIG. 1.
Figure 5B:
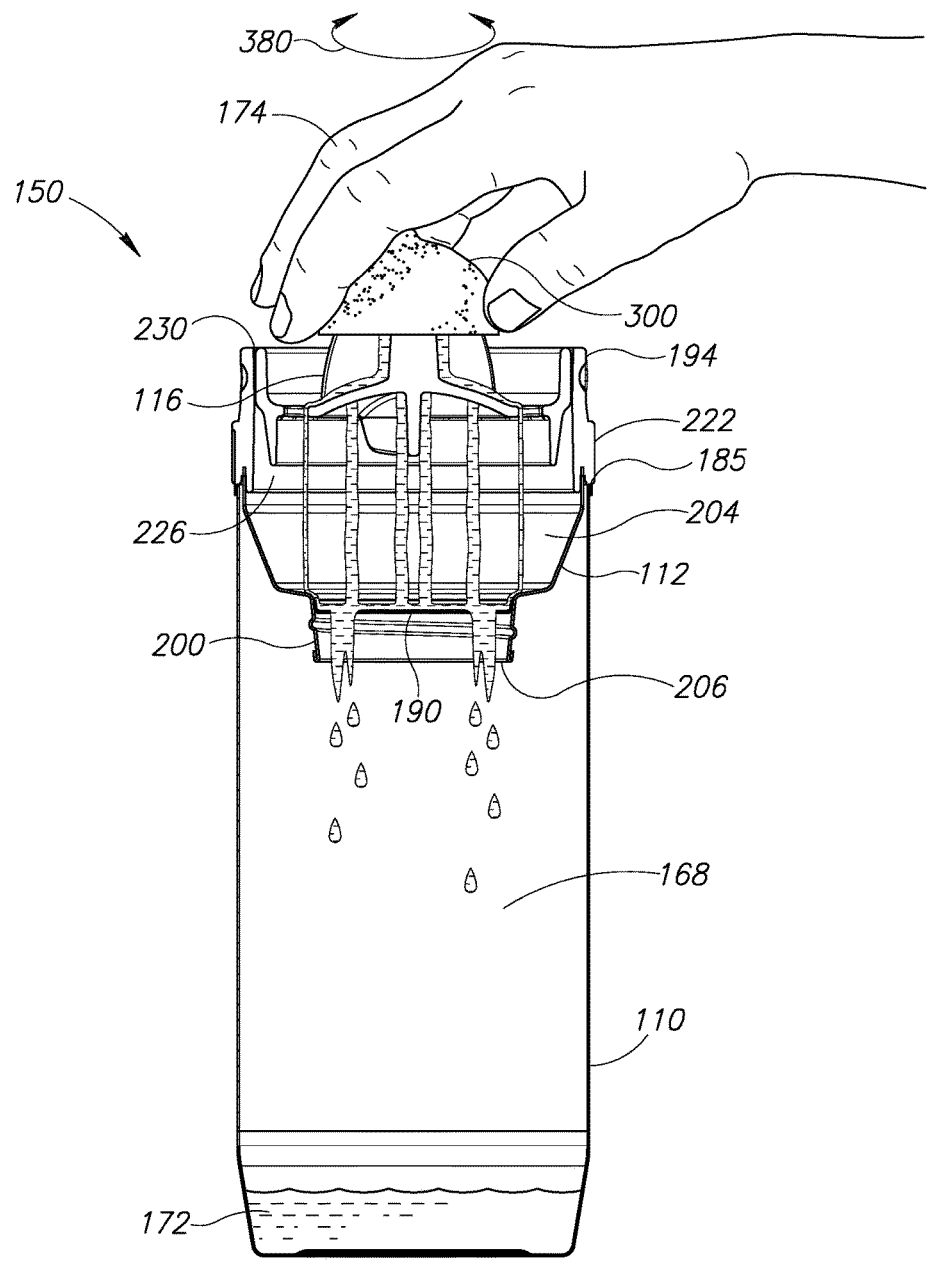
FIG. 5B is an illustration of a user using the first juicing subassembly (shown in cross-section) of FIG. 5A to produce citrus juice.

As may be viewed in FIG. 4, the grip portion 222 extends radially outwardly farther than the upper lid portion 192 and the lower connector portion 224. The grip portion 222 is too large to be received inside the opening 184 (see FIG. 3) of the vessel 110. However, as shown in FIG. 5A, the upper lid portion 192 is small enough to be received inside the opening 184 (see FIG. 3) of the vessel 110. Thus, when the lid 112 is in the inverted orientation with respect to the vessel 110, the upper lid portion 192 may be placed inside the opening 184 (see FIG. 3) of the vessel 110 with the grip portion 222 resting upon the upper edge 185 of the vessel 110. Referring to FIG. 4, the user 174 (see FIG. 5B) may grip the grip portion 222 and apply a rotational force to the lid 112 via the grip portion 222. At the same time, the user 174 (see FIG. 5B) may grasp the vessel 110 firmly to prevent its rotation. In this manner, the lid 112 may be rotated with respect to the vessel 110. Alternatively, the user 174 (see FIG. 5B) may grip the grip portion 222 firmly to prevent the lid 112 from rotating with respect to the vessel 110 (e.g., when rotational forces are applied to the citrus reamer 116 as illustrated in FIG. 5B) by the user 174.

Figure 8:
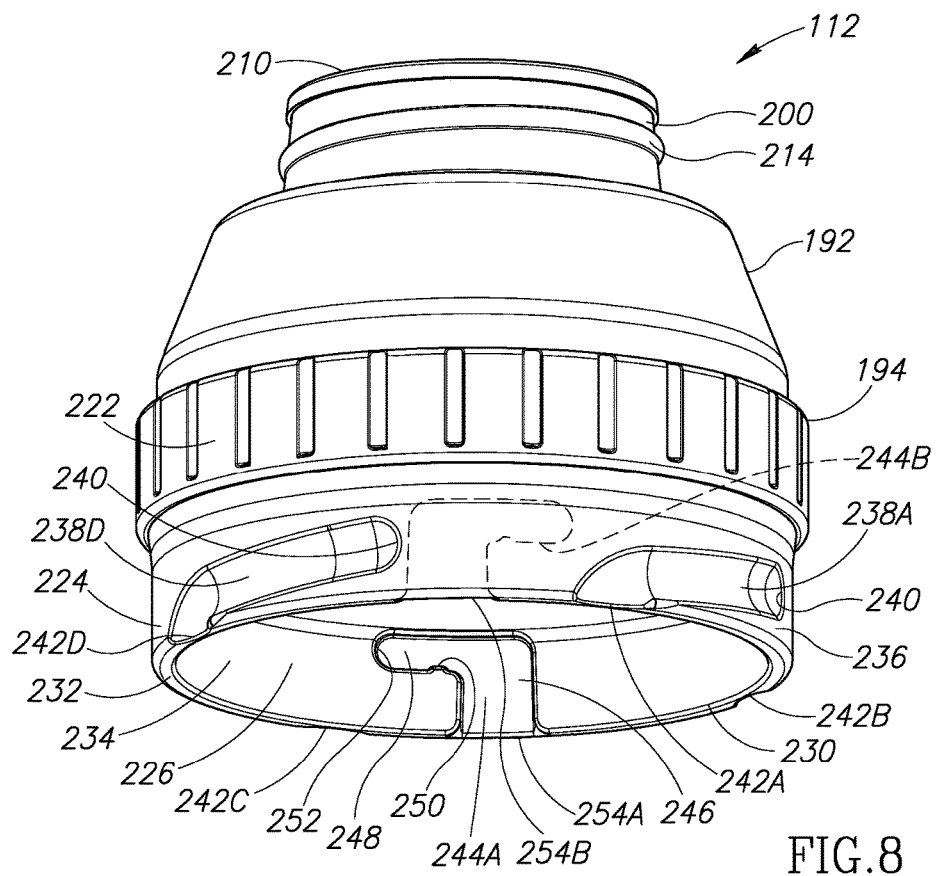
FIG. 8 is a perspective view of an underside of the lid of the assembly of FIG. 1.

Referring to FIG. 8, a lower opening 230 of the through-channel 226 is formed in the lower connector portion 224 of the lower lid portion 194. The lower opening 230 is surrounded by a lower edge 232 of the lower connector portion 224. The lower connector portion 224 has an inside surface 234 opposite an outside surface 236. Referring to FIG. 3, the lower connector portion 224 is configured to be received inside the opening 184 formed in the open upper portion 180 of the vessel 110 and to be rotatable therein.

Referring to FIG. 8, circumferentially spaced apart bent or curved outside channels 238A-238D (the outside channels 238B and 238C are shown in FIG. 7) are formed in the outside surface 236 of the lower connector portion 224. In the embodiment illustrated, the outside channels 238A-238D are substantially identical to one another. The outside channels 238A-238D each extends upwardly from the lower edge 232. In the embodiment illustrated, each of the outside channels 238A-238D also extends circumferentially along the lower connector portion 224. The outside channels 238A-238D each terminates at a closed end 240. Each of the outside channels 238A-238D is open along the lower edge 232. Thus, referring to FIG. 8, spaced apart channel openings 242A-242D (formed in the outside surface 236) are positioned along the lower edge 232. The channel openings 242A-242D are configured to receive the projections 186A-186D (see FIG. 3), respectively, of the vessel 110 (see FIG. 3) into the outside channels 238A-238D, respectively.

Circumferentially spaced apart inside channels 244A and 244B are formed in the inside surface 234 of the lower connector portion 224. In the embodiment illustrated, the inside channels 244A and 244B are substantially identical to one another and are positioned across the through-channel 226 from one another. Each of the inside channels 244A and 244B is generally L-shaped and has an open first leg 246 that opens into a closed second leg 248. In the embodiment illustrated, the first leg 246 is substantially orthogonal to the second leg 248. The first leg 246 extends upwardly from the lower edge 232. The second leg 248 extends circumferentially away from the first leg 246 along the lower connector portion 224. The second leg 248 has a bump or projection 250 formed therein and terminates at a closed end 252. The first leg 246 of each of the inside channels 244A and 244B is open along the lower edge 232. Thus, spaced apart openings 254A and 254B (formed in the inside surface 234) into the inside channels 244A and 244B, respectively, are positioned along the lower edge 232.

Figure 10:
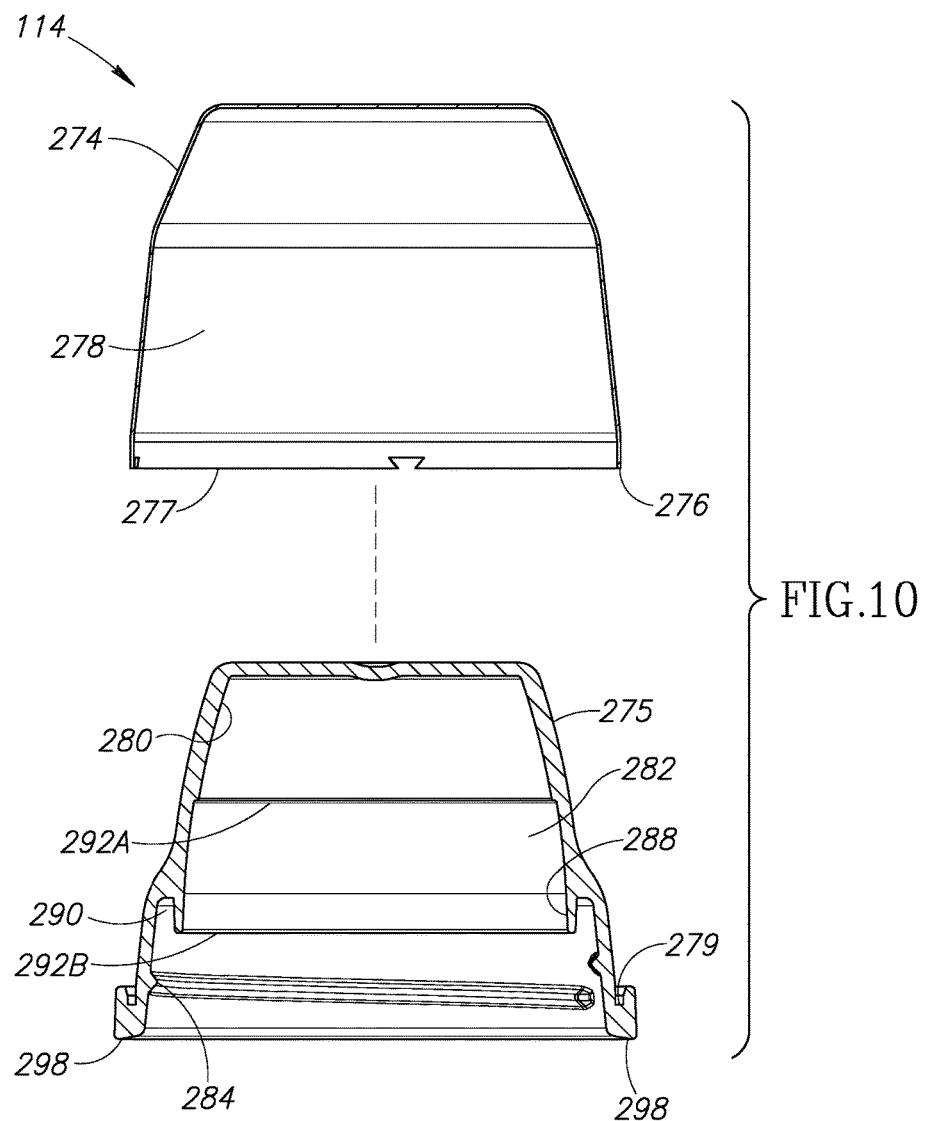
FIG. 10 is an exploded side cross-sectional view of the cap of the assembly of FIG. 1.

Referring to FIG. 3, the cap 114 is configured to receive the open upper threaded portion 200 of the lid 112 and form a fluid tight seal therewith. Thus, the cap 114 covers and seals the upper opening 206 (see FIG. 7). Referring to FIG. 10, in the embodiment illustrated, the cap 114 has a two part construction that includes an outer cap 274 attached (e.g., glued, press fit, and the like) to a cap liner 275.

The outer cap 274 may be constructed from a rigid or durable material that will protect the cap liner 275 from wear. The outer cap 274 has a lower rim 276 that defines an opening 277 into a hollow interior 278.

Figure 9:
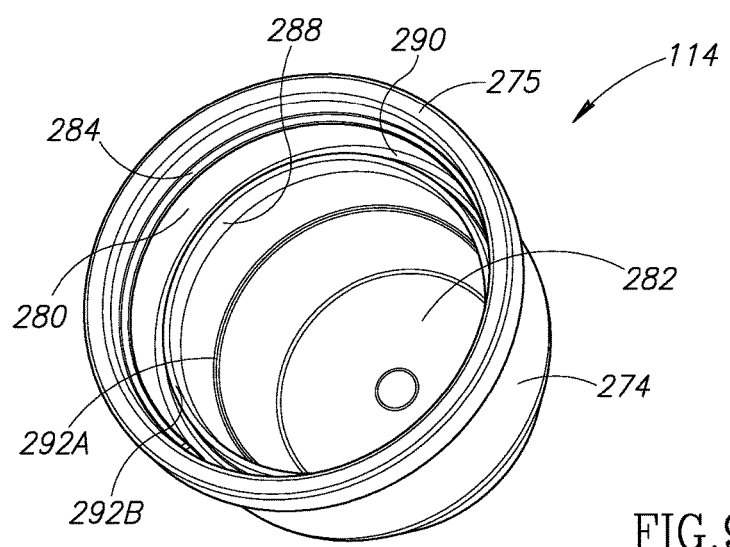
FIG. 9 is a perspective view of an inside of the cap of the assembly of FIG. 1.

Referring to FIG. 2B, the cap liner 275 is constructed from a material configured to form a fluid tight seal with the upper threaded portion 200 of the lid 112. Referring to FIG. 9, the cap liner 275 lines the interior 278 (see FIG. 10) of the outer cap 274. Referring to FIG. 10, the cap liner 275 has an outer ring-shaped channel 279 formed therein configured to receive the lower rim 276 of the outer cap 274. Thus, the cap liner 275 wraps around and covers the lower rim 276 of the outer cap 274. By way of a non-limiting example, the lower rim 276 may be press fit into the channel 279 or otherwise held in place by friction between the lower rim 276 the sidewalls of the channel 279.

Referring to FIGS. 9 and 10, the cap liner 275 is generally cup-shaped and has an inside surface 280 that defines a hollow interior 282. The inside surface 280 has inside threads 284 formed therein that are configured to threadedly engage the outside threads 214 (see FIG. 7) of the upper threaded portion 200 of the lid 112. Threaded engagement between the outside threads 214 and the inside threads 284 maintains the cap 114 on the lid 112 and seals the ingredients 170 (see FIG. 4) inside the cocktail shaker subassembly 140.

Referring to FIG. 2B, the inside surface 280 of the cap liner 275 has an inner ring-shaped channel 290 formed therein. The channel 290 is configured to receive and wrap around the upper edge 210 of the upper threaded portion 200. A sealing flange or sidewall 288 is formed in the inside surface 280 along the channel 290. When the upper edge 210 of the upper threaded portion 200 is inside the channel 290, the sealing sidewall 288 helps form a seal along the upper edge 210. By way of a non-limiting example, the threaded engagement between the outside threads 214 and the inside threads 284 and/or the seal formed within the channel 290 between the upper edge 210 and the inside surface 280 may be a knife-edge seal.

As mentioned above, the cap liner 275 wraps around and covers the lower rim 276 of the outer cap 274. A lower portion 298 of the cap liner 275 is configured to abut the lid 112 when the cap 114 is installed on the lid 112. In the embodiment illustrated, the lower portion 298 abuts the shoulder portion 220. A fluid tight seal may be formed between the lower portion 298 of the cap liner 275 and the lid 112.

Referring to FIGS. 9 and 10, the cap 114 may be used to measure ingredients. For example, the inside surface 280 may include one or more measurement markings or indicators 292A and 292B that identify an amount (e.g., volume) of liquid. In the embodiment illustrated, the indicator 292A is a shoulder or projection formed in the inside surface 280, and the indicator 292B is an edge of the sealing sidewall 288 that defines an opening into the channel 290. In the embodiment illustrated, the indicator 292A identifies 0.5 fluid ounces, and the indicator 292B identifies one fluid ounce. Thus, the cap 114 may be used as a measuring cup to measure 0.5 fluid ounces of liquid by inverting the cap 114, and pouring the liquid into the interior 282 of the cap 114 until the surface of the liquid reaches the indicator 292A. Similarly, the cap 114 may be used as a measuring cup to measure one fluid ounce of liquid by inverting the cap 114, and pouring the liquid into the interior 282 of the cap 114 until the surface of the liquid reaches the indicator 292B.

Referring to FIG. 4, the cap 114 may be selectively disengaged from the lid 112 to allow the ingredients 170 to be poured into or out of the vessel 110 through the channels 204 (see FIGS. 7) and 226 (see FIG. 7) of the lid 112. Referring to FIG. 7, when present, the strainer 190 positioned across the channel 204 may strain undesired items (e.g., ice, seeds, and the like) from the ingredients 170 (see FIG. 4) as the ingredients 170 flow through the channel 204 and the through-holes 196 (see FIG. 7) of the strainer 190.

Referring to FIG. 3, to assemble the lid 112 and the vessel 110 together to form part of the cocktail shaker subassembly 140 (see FIG. 4), the lid 112 is placed in the upright orientation with respect to the vessel 110. Then, the lower connector portion 224 of the lower lid portion 194 of the lid 112 is positioned inside the opening 184 of the vessel 110 with the channel openings 242A-242D (see FIG. 8) aligned with the projections 186A-186D, respectively. The lid 112 is pressed in to the vessel 110 until the projections 186A-186D are received inside the channel openings 242A-242D (see FIG. 8), respectively. Because the outside channels 238A-238D are curved, the inward movement of the lid 112 may be halted by the curvature of the outside channels 238A-238D.

Next, the lid 112 is rotated with respect to the vessel 110 in an engagement direction (e.g., clockwise) to drive the projections 186A-186D through the outside channels 238A-238D, respectively, until the projections 186A-186D abut the closed ends 240 (see FIGS. 7 and 8) of the outside channels 238A-238D, respectively. In other words, the projections 186A-186D slide upwardly into the channel openings 242A-242D (see FIG. 8), respectively. Then, the projections 186A-186D slide upwardly and circumferentially through the outside channels 238A-238D, respectively, until the projections 186A-186D encounter the closed ends 240 (see FIGS. 7 and 8) of the outside channels 238A-238D, respectively, which halt the movement of the projections 186A-186D in the outside channels 238A-238D, respectively.

As the projections 186A-186D slide within the outside channels 238A-238D, respectively, the lid 112 is pulled downwardly into the opening 184 formed in the upper portion 180 of the vessel 110. When the projections 186A-186D are spaced (within the outside channels 238A-238D, respectively) circumferentially away from the openings 242A-242D (see FIG. 8), respectively, the lid 112 cannot be disengaged along the longitudinal axis 130 (shown in FIGS. 2A and 4) from the vessel 110. Thus, the lid 112 may be described as being twisted onto the vessel 110. In other words, a bayonet type connection (in which the projections 186A-186D function as bayonet mounts) is used to removably attach the lid 112 to the vessel 110. Friction between the outside surface 236 of the lower connector portion 224 of the lower lid portion 194 of the lid 112 and the inside surface 189 of the vessel 110 may help prevent inadvertent or unintentional rotation in a disengagement direction (e.g., counterclockwise) of the lid 112 with respect to the vessel 110 and vice versa.

Next, referring to FIG. 4, the cap 114 may be threaded onto the lid 112 to seal the ingredients 170 inside the cocktail shaker subassembly 140. At this point, the user 174 (see FIG. 5B) may shake the cocktail shaker subassembly 140 to mix the ingredients 170 together. When the user 174 has finished shaking the cocktail shaker subassembly 140, the cap 114 may be removed (unthreaded) from the lid 112. At this point, the shaken ingredients 170 may be poured from the cocktail shaker subassembly 140 (e.g., into one of the cups 120 illustrated in FIGS. 2A-3 and 15).

The lid 112 may be disengaged from the vessel 110 by rotating the lid 112 in the disengagement direction (e.g., counterclockwise) with sufficient force to overcome any friction between the outside surface 236 of the lower connector portion 224 of the lower lid portion 194 of the lid 112 and the inside surface 189 of the vessel 110. As the lid 112 is rotated in the disengagement direction (e.g., counterclockwise), the projections 186A-186D travel through the outside channels 238A-238D, respectively, until the projections 186A-186D are adjacent the openings 242A-242D (see FIG. 8), respectively. As the projections 186A-186D slide within the outside channels 238A-238D, respectively, the lid 112 is travels outwardly from the opening 184 formed in the upper portion 180 of the vessel 110. When the projections 186A-186D are adjacent the openings 242A-242D, respectively, the lid 112 is disengaged from the vessel 110 by pulling the lid 112 away from the vessel 110 along the longitudinal axis 130 (see FIGS. 2A and 4). Thus, the lid 112 may be described as being twisted off the vessel 110.

First Juicing Subassembly

FIGS. 5A and 5B are cross-sectional views of the first juicing subassembly 150. Referring to FIGS. 5A and 5B, the vessel 110, the lid 112 (in the inverted orientation with respect to the vessel 110), and the citrus reamer 116 (in the use orientation with respect to the lid 112) may be assembled to form the first juicing subassembly 150. The strainer 190 may be omitted from the lid 112 inside the first juicing subassembly 150. However, this is not a requirement. For example, referring to FIG. 5B, the strainer 190 may be permanently attached (e.g., welded) inside the upper threaded portion 200 within the channel 204.

The citrus reamer 116 and the lid 112 are rotatable with respect to one another. For the sake of brevity, whenever one of these components may be rotated with respect to the other to form an assembly or disassemble an assembly, the citrus reamer 116 will be described as being rotated with respect to the lid 112. However, in the alternative, the lid 112 may be rotated with respect to the citrus reamer 116, or the lid 112 and the citrus reamer 116 may both be rotated (in opposite directions) with respect to one another at the same time.

Referring to FIG. 5A, in the first juicing subassembly 150, the lid 112 is placed in the inverted orientation with respect to the vessel 110 and the upper lid portion 192 is inserted into the opening 184 (see FIG. 3) of the vessel 110. The grip portion 222 of the lower lid portion 194 rests upon the upper edge 185 of the vessel 110. The upper lid portion 192 extends downwardly from the lower lid portion 194 into the interior 168 of the vessel 110. The channels 204 and 226 are both aligned with and extend along the longitudinal axis 130 (see FIGS. 2A and 2B) of the vessel 110. The citrus reamer 116 is positioned in the use orientation with respect to the lid 112 and coupled to the lower lid portion 194 inside the through-channel 226. The citrus reamer 116 extends across the channel 226 and outwardly beyond the lower opening 230.

The citrus reamer 116 may be constructed from a rigid or durable material. By way of a non-limiting example, the citrus reamer 116 may be constructed from polypropylene.

Figure 11:
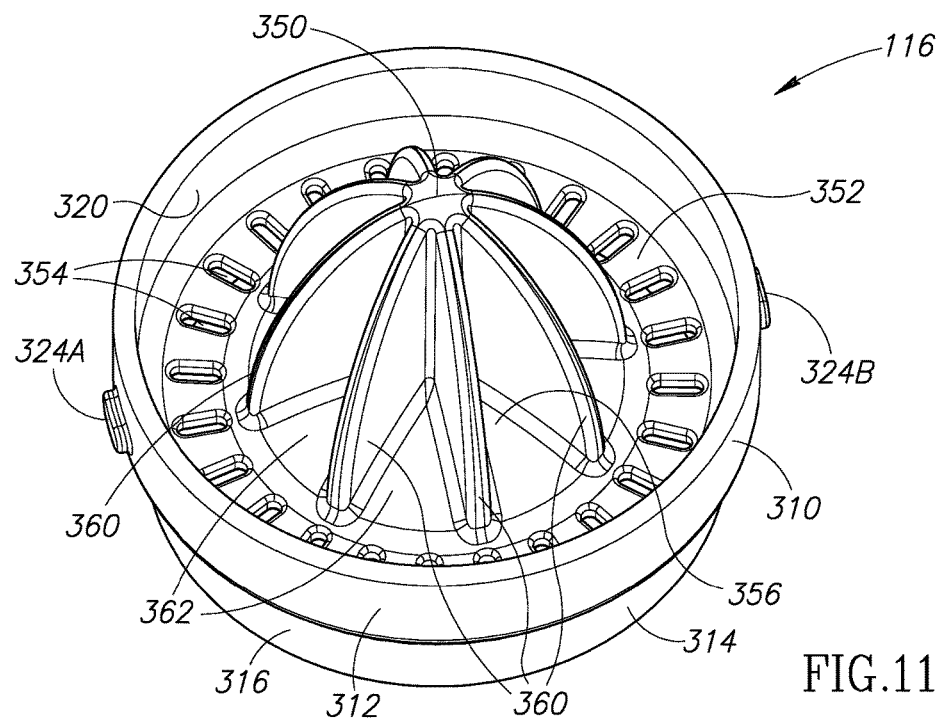
FIG. 11 is a perspective view of an upper portion of the citrus reamer of the assembly of FIG. 1.
Figure 12:
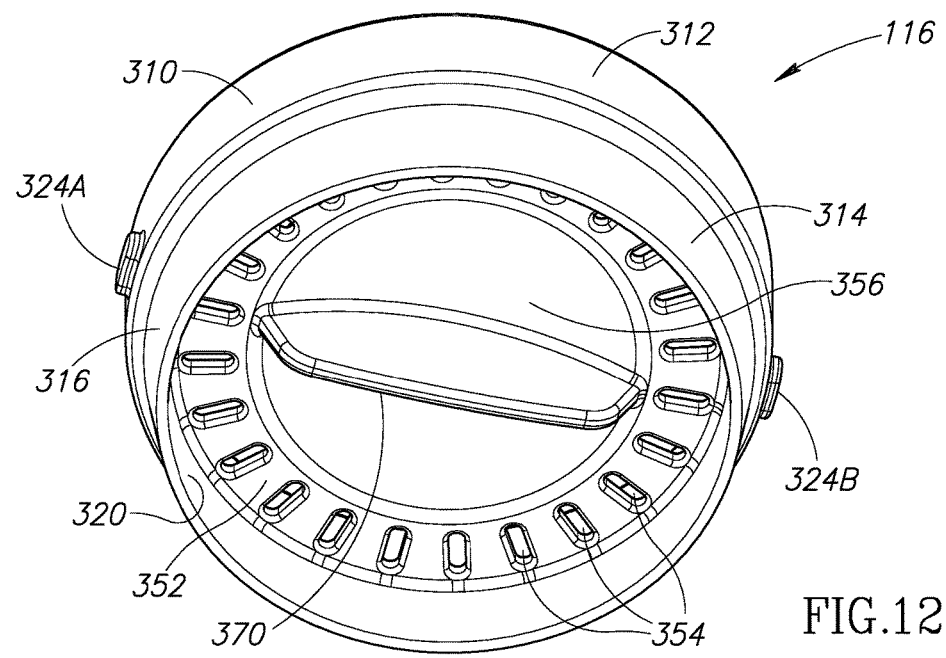
FIG. 12 is a perspective view of an underside of the citrus reamer of the assembly of FIG. 1.

Referring to FIGS. 11 and 12, the citrus reamer 116 has a generally ring-shaped upper body portion 310 with an outside surface 312 and a generally ring-shaped lower body portion 314 with an outside surface 316. The upper body portion 310 has a larger diameter than the lower body portion 314. An open-ended inside channel 320 extends through the citrus reamer 116. Referring to FIG. 5A, when the first juicing subassembly 150 is fully assembled, the inside channel 320 is aligned with and extends along the longitudinal axis 130 (see FIGS. 2A and 2B) of the vessel 110.

Figure 13:
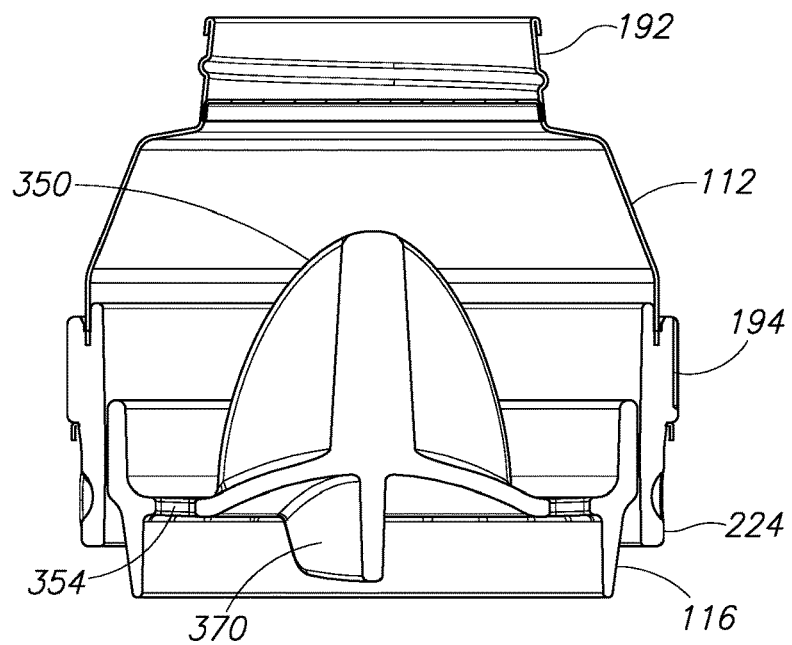
FIG. 13 is a cross-sectional view of a first subassembly that includes the lid (illustrated in an upright orientation) coupled to the citrus reamer, which is arranged in a storage orientation with respect to the lid.
Figure 14:
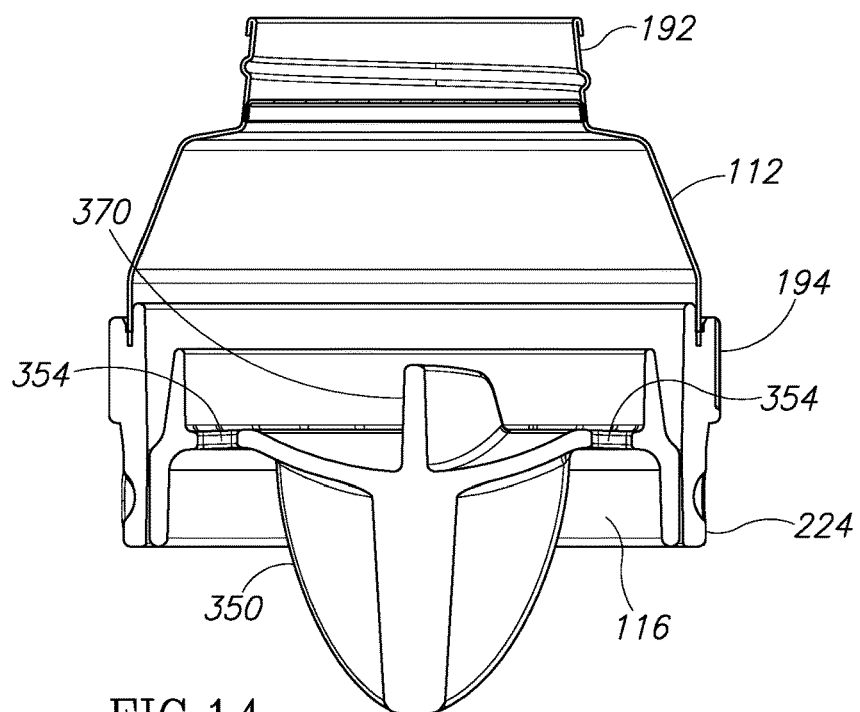
FIG. 14 is a cross-sectional view of a second subassembly that includes the lid (illustrated in an upright orientation) coupled to the citrus reamer, which is arranged in a use orientation with respect to the lid.

A plurality of projections 324A and 324B extend outwardly from the outside surface 312 of the upper body portion 310. Referring to FIG. 8, the outwardly extending projections 324A and 324B (see FIGS. 11 and 12) are configured to be received inside the openings 254A and 254B, respectively, of the inside channels 244A and 244B, respectively, of the lid 112. Referring to FIGS. 13 and 14, the citrus reamer 116 may be in either the storage orientation (see FIG. 13) or the use orientation (see FIG. 14) with respect to the lid 112 when the outwardly extending projections 324A and 324B (see FIGS. 11 and 12) of the citrus reamer 116 are received inside the openings 254A and 254B (see FIG. 8), respectively.

Referring to FIG. 11, the citrus reamer 116 has a conical or dome shaped reaming projection 350 that extends upwardly (beyond the upper body portion 310) from a disk-shaped strainer 352 positioned across the inside channel 320. In the embodiment illustrated, the strainer 352 is positioned at or near the location whereat the upper body portion 310 attaches to the lower body portion 314. The reaming projection 350 is positioned at or near a central portion 356 of the strainer 352. The reaming projection 350 has a plurality of outwardly extending fins or ribs 360 with interstitial channels 362 defined therebetween. The strainer 352 includes a plurality of through-holes 354 configured to allow the citrus juice 172 (see FIG. 5B) to pass therethrough.

Referring to FIG. 12, a gripping projection 370 extends downwardly from the central portion 356 of the strainer 352 under the reaming projection 350 (see FIG. 11). When the citrus reamer 116 is in the storage orientation (see FIGS. 2A-3, 13, and 15) with respect to the lid 112, the user may rotate the citrus reamer 116 by gripping the gripping projection 370 and applying a rotational force (in an engagement direction or a disengagement direction) thereto. Alternatively, when the citrus reamer 116 is in the use orientation (see FIGS. 5A, 5B, and 14) with respect to the lid 112, the user may rotate the citrus reamer 116 by gripping the reaming projection 350 and applying a rotational force (in an engagement direction or a disengagement direction) thereto.

To assemble the lid 112 and the citrus reamer 116 together to form part of the first juicing subassembly 150, the citrus reamer 116 is placed in the use orientation with respect to the lid 112 and inserted into the channel 226 of the lower lid portion 194 through the lower opening 230. The outwardly extending projections 324A and 324B are aligned with and inserted into the openings 254A and 254B, respectively, of the inside channels 244A and 244B, respectively, of the lower lid portion 194. After the outwardly extending projections 324A and 324B of the citrus reamer 116 have been positioned inside the openings 254A and 254B, respectively, the citrus reamer 116 is pushed further into the channel 226 of the lower lid portion 194 causing the projections 324A and 324B to slide longitudinally within the first legs 246 (see FIG. 8) of the inside channels 244A and 244B, respectively. This inward longitudinal movement of the projections 324A and 324B may be halted when the projections 324A and 324B reach the ends of the first legs 246 of the inside channels 244A and 244B, respectively. Then, the citrus reamer 116 is rotated in an engagement direction (e.g., clockwise), causing the projections 324A and 324B to slide from the first legs 246 into the second legs 248. The user continues rotating the citrus reamer 116, until the projections 324A and 324B slide circumferentially within the second legs 248 of the inside channels 244A and 244B, respectively, traverse the projections 250, and are halted by the closed ends 252 of the inside channels 244A and 244B, respectively.

When the projections 324A and 324B are in the second legs 248, the projections 324A and 324B are spaced circumferentially from the openings 254A and 254B, respectively, and the citrus reamer 116 cannot be disengaged longitudinally from the lid 112. Thus, the citrus reamer 116 may be described as being twisted onto the lid 112. In other words, a bayonet type connection (in which the projections 324A and 324B function as bayonet mounts) is used to removably attach the citrus reamer 116 to the lid 112. The projections 250 help prevent inadvertent or unintentional rotation of the citrus reamer 116 with respect to the lid 112 in a disengagement direction (e.g., counterclockwise). Additionally, friction between the inside surface 234 of the lower connecting portion 224 of the lower lid portion 194 and the outside surface 312 of the upper body portion 310 of the citrus reamer 116 may help prevent inadvertent or unintentional rotation in a disengagement direction (e.g., counterclockwise) of the citrus reamer 116 with respect to the lid 112.

Next, the first juicing subassembly 150 may be assembled by placing the lid 112 (with the citrus reamer 116 coupled thereto) in the inverted orientation with respect to the vessel 110, and inserting the upper lid portion 192 of the lid 112 into the opening 184 (see FIG. 3) of the vessel 110 until the grip portion 222 of the lower lid portion 194 rests upon the upper edge 185 of the vessel 110.

Referring to FIG. 5B, a citrus fruit 300 may be pressed against the reaming projection 350 of the citrus reamer 116 and rotated in directions identified by curved double-headed arrow 380 to produce the citrus juice 172. This applies a rotational force to the reaming projection 350 that may be translated by the citrus reamer 116 to the lid 112. The user 174 may grip the grip portion 222 and the vessel 110 at the same time to prevent the lid 112 from rotating with respect to the vessel 110.

The citrus juice 172 produced flows downwardly through the through-holes 354 and enters the channel 226. The citrus juice 172 flows through the channel 226 into the channel 204, and exits therefrom through the upper opening 206. The citrus juice 172 exiting the upper opening 206 enters the interior 168 of the vessel 110 and collects therein.

After the citrus juice 172 is collected, the first juicing subassembly 150 may be disassembled by removing the lid 112 with the citrus reamer 116 coupled thereto from the vessel 110. Then, the citrus reamer 116 may be disengaged from the lid 112 by rotating the citrus reamer 116 in the disengagement direction (e.g., counterclockwise) until the projections 324A and 324B (see FIGS. 11 and 12) slide from the second legs 248 (see FIG. 8) into the first legs 246 (see FIG. 8). Then, the citrus reamer 116 is pulled outwardly from the lid 112 causing the projections 324A and 324B to slide through the first legs 246 and out the openings 254A and 254B (see FIG. 8), respectively. Thus, the citrus reamer 116 may be described as being twisted off the lid 112.

Optionally, additional ingredients may be added to the vessel 110 through the opening 184 (see FIG. 3). Then, referring to FIG. 4, the vessel 110, the lid 112, and the cap 114 may be assembled (as described above) to form the cocktail shaker subassembly 140 (see FIG. 4). Finally, the user may shake the ingredients 170 inside the cocktail shaker subassembly 140 (see FIG. 4). After the ingredients 170 have been shaken, the cap 114 may be removed from the lid 112 and the ingredients 170 poured from the cocktail shaker subassembly 140 through the lid 112. By way of a non-limiting example, the shaken ingredients 170 may be poured into one or more of the cups 120 (see FIGS. 2A-3 and 15).

Second Juicing Subassembly

Figure 6A:
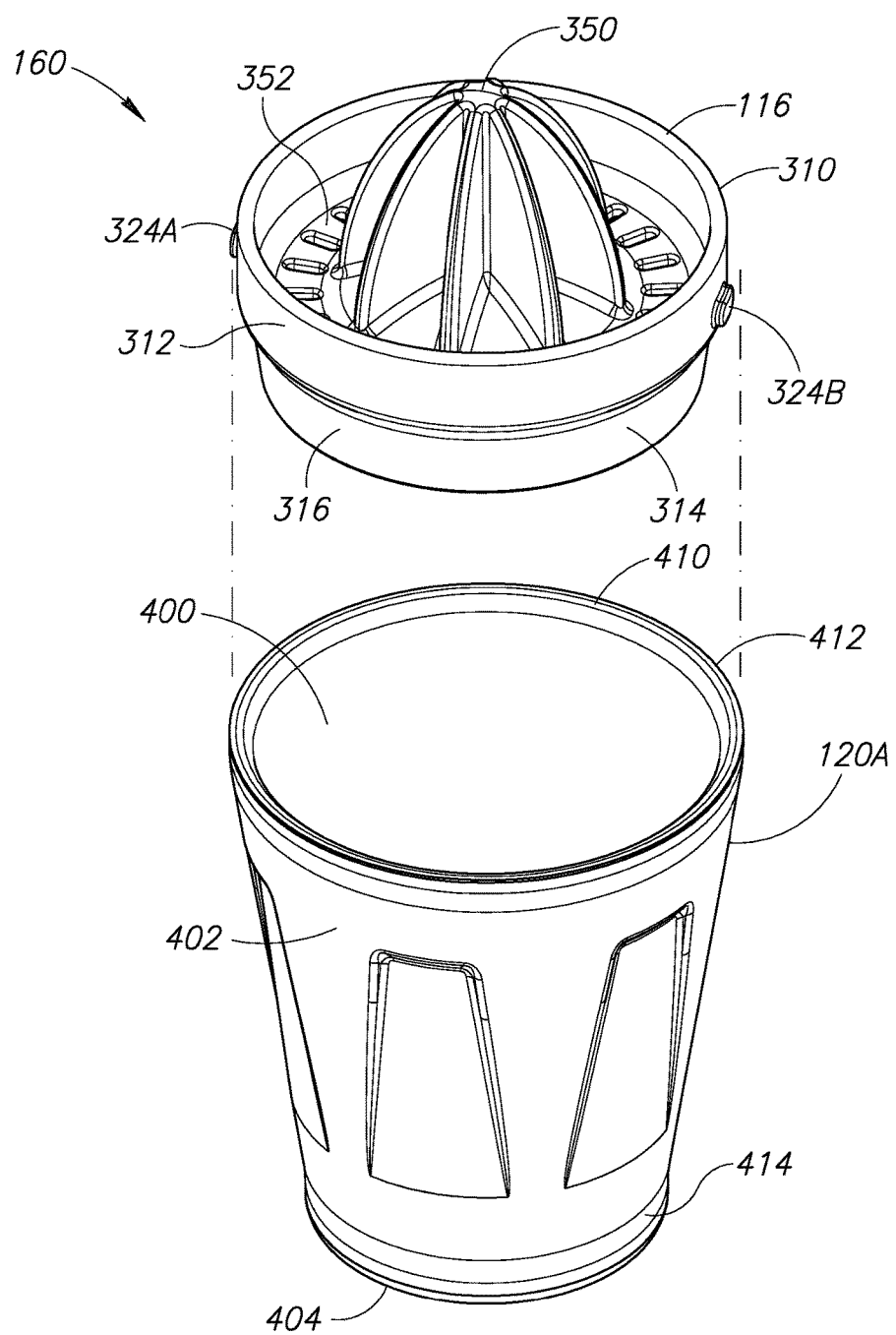
FIG. 6A is an exploded perspective view of a second juicing subassembly constructed from the citrus reamer and one of the cups of the assembly of FIG. 1.
Figure 6B:
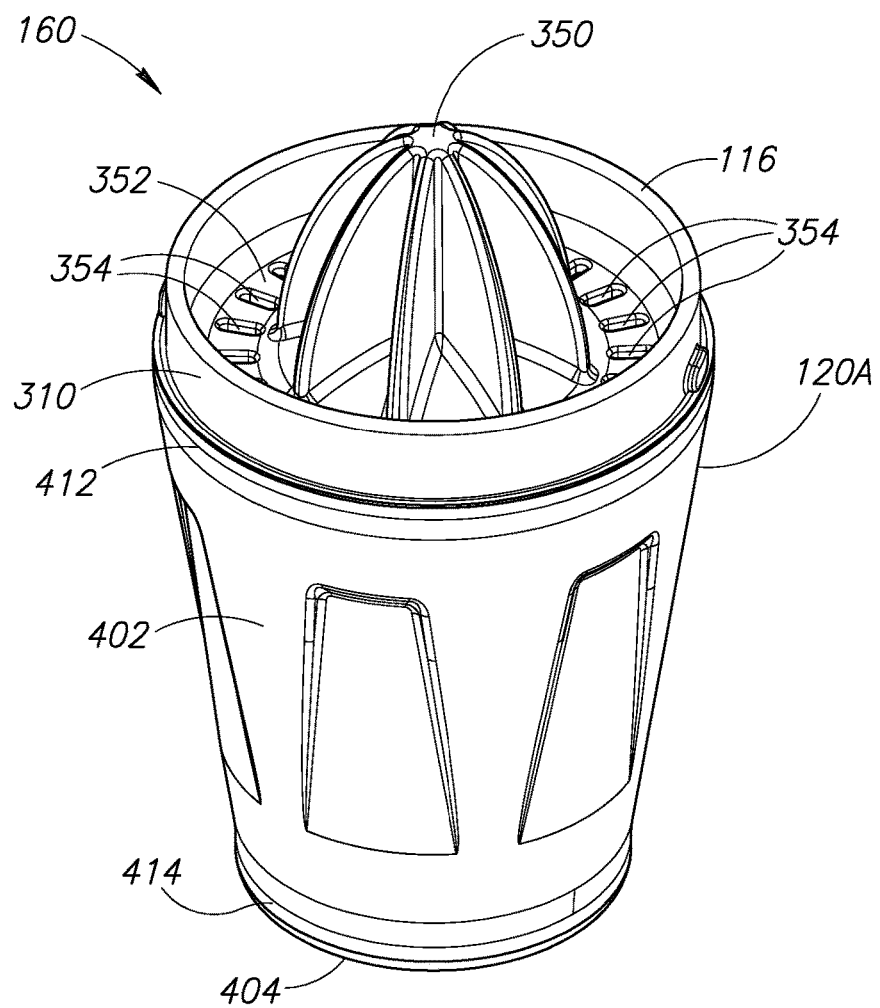
FIG. 6B is a perspective view of the second juicing subassembly of FIG. 6A.

Referring to FIGS. 6A and 6B, the second juicing subassembly 160 is assembled by partially inserting the citrus reamer 116 into one of the cups 120. The cups 120 are substantially identical to one another. Therefore, for the sake of brevity, only one of the cups 120, namely the cup 120A, will be described in detail below.

Referring to FIG. 6A, the cup 120A has a fluid tight hollow interior 400 defined by a sidewall 402 and a closed base or bottom 404. The sidewall 402 extends upwardly from the bottom 404 and terminates at a rim portion 412. An opening 410 into the interior 400 is defined by the rim portion 412. The rim portion 412 is opposite the closed bottom 404. The sidewall 402 has a base portion 414 adjacent the bottom 404.

The opening 410 is configured to receive the base portion 414 of a different one of the cups 120 (see FIGS. 2A, 3, and 15). For example, the cup 120B (see FIGS. 2A, 3, and 15) may be stacked on or nested inside the cup 120A by placing the cup 120A upright (on its base portion 414) and inserting the base portion 414 of the cup 120B into the opening 410 of the cup 120A. In this configuration, the cup 120B extends downwardly at least part way into the interior 400 of the cup 120B. When nested in this manner, the cups 120A and 120B may be positioned inside a hollow interior 168' (see FIG. 15) of the vessel 110' (see FIG. 15). Alternatively, the cup 120C (see FIGS. 2A and 3) may be nested into the cup 120B, which is nested into the cup 120A. Additionally, as shown in FIGS. 2A and 3, the cup 120D may be nested into the cup 120C, which is nested into the cup 120B, which is nested into the cup 120A. When nested in this manner, the cups 120A-120D may be positioned inside the interior 168 of the vessel 110.

Referring to FIG. 6A and 6B, as mentioned above, the second juicing subassembly 160 is assembled by partially inserting the citrus reamer 116 into the cup 120A. Referring to FIG. 6A, the lower body portion 314 of the citrus reamer 116 is configured to be received inside the opening 410 of the cup 120A. As shown in FIG. 6B, the upper body portion 310 is too large to pass through the opening 410 (see FIG. 6A). Instead, the upper body portion 310 rests upon the rim portion 412 of the sidewall 402 of the cup 120A. In this configuration, the lower body portion 314 (see FIG. 6A) extends into the interior 400 (see FIG. 6A) of the cup 120A.

The second juicing subassembly 160 may be used to produce the citrus juice 172 (see FIG. 5B). The citrus fruit 300 (see FIG. 5B) may be pressed against the reaming projection 350 of the citrus reamer 116 to produce the citrus juice 172 (see FIG. 5B), which flows through the through-holes 354 in the strainer 352 and collects inside the cup 120A.

After the citrus juice 172 is collected, the second juicing subassembly 160 may be disassembled by removing the citrus reamer 116 from the cup 120A. Then, the user may drink the freshly squeezed citrus juice 172 from the cup 120A or pour the citrus juice 172 from the cup 120A into another container. For example, the citrus juice 172 may be poured into the vessel 110 through the opening 184 (see FIG. 3). Referring to FIG. 4, optionally, additional ingredients may be added to the vessel 110 through the opening 184 (see FIG. 3). Then, the vessel 110, the lid 112, and the cap 114 may be assembled (as described above) to form the cocktail shaker subassembly 140 (see FIG. 4). Finally, the user may shake the ingredients 170 inside the cocktail shaker subassembly 140 (see FIG. 4). After the ingredients 170 have been shaken, the cap 114 may be removed from the lid 112 and the ingredients 170 poured from the cocktail shaker subassembly 140 through the lid 112. By way of a non-limiting example, the shaken ingredients 170 may be poured into one or more of the cups 120 (see FIGS. 2A and 3).

Assemblies

Referring to FIGS. 2A-3, the assembly 100 may be assembled by nesting the cups 120A-120D and placing the nested cups 120 inside the interior 168 of the vessel 110. If the strainer 190 (see FIG. 2B-5B, 7, and 15) has been removed from the upper lid portion 192, the strainer 190 is inserted into the upper lid portion 192. The citrus reamer 116 (in the storage orientation with respect to the lid 112) is twisted onto the lid 112. Next, the lid 112 (with the citrus reamer 116 coupled thereto) is placed in the upright orientation with respect to the vessel 110 and twisted onto the upper portion 180 of the vessel 110. Finally, the cap 114 is threaded onto the upper threaded portion 200 of the upper lid portion 192.

The assembly 100 may be disassembled by twisting or rotating the cap 114 in a disengagement direction (e.g., counterclockwise) to unthread the cap 114 and disengage it from the upper threaded portion 200 of the upper lid portion 192. Next, the lid 112 (with the citrus reamer 116 coupled thereto) is twisted off the upper portion 180 of the vessel 110. The citrus reamer 116 may be twisted off the lid 112, if desired. The nested cups 120 are removed from inside the interior 168 of the vessel 110 and, optionally, un-nested.

Referring to FIG. 15, the assembly 100' may be assembled by nesting the cups 120A and 120B and placing the nested cups 120 inside the interior 168' of the vessel 110'. If the strainer 190 has been removed from the upper lid portion 192 of the lid 112, the strainer 190 is inserted into the upper lid portion 192. The citrus reamer 116 (in the storage orientation with respect to the lid 112) is twisted onto the lid 112. Next, the lid 112 (with the citrus reamer 116 coupled thereto) is placed in the upright orientation with respect to the vessel 110' and twisted onto an upper portion 180' of the vessel 110'. Finally, the cap 114 is threaded onto the upper threaded portion 200 of the upper lid portion 192.

The assembly 100' may be disassembled by twisting or rotating the cap 114 in a disengagement direction (e.g., counterclockwise) to unthread the cap 114 and disengage it from the upper threaded portion 200 of the upper lid portion 192. Next, the lid 112 (with the citrus reamer 116 coupled thereto) is twisted off the upper portion 180' of the vessel 110'. The citrus reamer 116 may be twisted off the lid 112, if desired. The nested cups 120 are removed from inside the interior 168' of the vessel 110' and, optionally, un-nested.

Optionally, the cocktail shaker subassembly 140 (see FIG. 4) may be assembled by placing the lid 112 (without the citrus reamer 116 coupled thereto) in the upright orientation with respect to the vessel 110', and twisting the lid 112 onto the upper portion 180' of the vessel 110'. If the strainer 190 was removed from the upper lid portion 192 of the lid 112, the strainer 190 may be inserted into the upper lid portion 192 before or after the lid 112 is twisted onto the vessel 110'. Then, the cap 114 is threaded onto the upper threaded portion 200 of the upper lid portion 192. To disassemble the cocktail shaker subassembly 140 (see FIG. 4), the cap 114 is removed from the lid 112, and the lid 112 is twisted off the upper portion 180' of the vessel 110'.

Optionally, the first juicing subassembly 150 (see FIGS. 5A and 5B) may be assembled by placing the citrus reamer 116 in the use orientation with respect to the lid 112, and twisting the citrus reamer 116 onto the lid 112. Then, the lid 112 is placed in the inverted orientation with respect to the vessel 110', and the upper lid portion 192 is inserted into the interior 168' of the vessel 110' until the grip portion 222 of the lower lid portion 194 rests upon the upper portion 180' of the vessel 110'. To disassemble the first juicing subassembly 150 (see FIGS. 5A and 5B), the lid 112 is removed from the vessel 110'. Then, the citrus reamer 116 may be twisted off the lid 112, if desired.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A kit comprising:
a vessel having an interior and a rim portion that defines an opening into the interior, the interior being configured to house a fluid;
a lid having a through-channel and a strainer extending across the through-channel, the strainer being removable from the lid, the lid being positionable with respect to the vessel in both a first orientation and a different second orientation, the lid being removably couplable to the vessel when in the first orientation, the lid being configured to rest upon the rim portion of the vessel when in the second orientation, the through-channel being in fluid communication with the opening when the lid is coupled to the vessel, the strainer being operable, when the lid is coupled to the vessel, to strain the fluid as the fluid flows from the interior through the opening into the through-channel and through the strainer;

a citrus reamer removably couplable to the lid within the through-channel; and a cap configured to be attached to the lid to cover the through-channel, (a) the vessel, the lid in the first orientation, the citrus reamer, and the cap being configured to be removably coupled together to form a kit assembly, (b) the vessel, the lid in the first orientation, and the cap being configured to be removably coupled together to form a cocktail shaker, and (c) the vessel, the lid in the second orientation, and the citrus reamer being configured to be removably coupled together to form a juicing assembly, the strainer being removed from the lid before the juicing assembly is formed so that the strainer is omitted from the juicing assembly.

2. The kit of claim 1, wherein the cocktail shaker does not include the citrus reamer.

3. The kit of claim 1, wherein the citrus reamer is removably couplable to the lid in both a storage orientation and a different use orientation with respect to the lid,
the citrus reamer is coupled to the lid in the use orientation in the juicing assembly, and
the citrus reamer is coupled to the lid in either the storage orientation or the use orientation in the kit assembly.

4. The kit of claim 3, wherein the citrus reamer has a reaming projection that extends into the through-channel when the citrus reamer is in the storage orientation, and
the reaming projection extends outwardly from the through-channel beyond the lid when the citrus reamer is in the use orientation.

5. The kit of claim 3, wherein a first one of the lid and the citrus reamer has a plurality of projections,
a different second one of the lid and the citrus reamer has a plurality of channels,
the plurality of projections are aligned with and inserted into the plurality of channels as the citrus reamer is at least partially inserted inside the through-channel in either the storage orientation or the use orientation, and
at least one of the lid and the citrus reamer is rotatable when the citrus reamer is at least partially inside the through-channel to move the plurality of projections through the plurality of channels to thereby removably couple the citrus reamer to the lid.

6. The kit of claim 1, wherein a first one of the lid and the vessel has a plurality of projections,
a different second one of the lid and the vessel has a plurality of channels,
the lid in the first orientation is partially insertable into the opening to position the plurality of projections inside the plurality of channels, and
at least one of the lid and the vessel is rotatable when the lid is partially inserted into the opening to move the plurality of projections through the plurality of channels to thereby removably couple the lid to the vessel.

7. The kit of claim 1, wherein a first one of the lid and the vessel has a plurality of projections,
a different second one of the lid and the vessel has a plurality of channels,
the lid in the first orientation is positionable with respect to the vessel to position the plurality of projections inside the plurality of channels, and
at least one of the lid and the vessel is rotatable to move the plurality of projections through the plurality of channels to thereby removably couple the lid to the vessel.

8. The kit of claim 1, further comprising:
a plurality of cups configured to be housed inside the interior of the vessel and to be removed from the interior of the vessel through the opening.

9. The kit of claim 8, wherein a selected one of the plurality of cups has a rim defining an opening into a cup interior,
the citrus reamer has a reaming projection and at least one through-hole,
the citrus reamer is configured to rest upon the rim of the selected cup with the reaming projection extending upwardly away from the cup interior,
the reaming projection is configured to have a citrus fruit pressed thereagainst to produce citrus juice when the citrus reamer is resting upon the rim of the selected cup, and
the at least one through-hole allows the citrus juice to flow into the cup interior when the citrus reamer is resting upon the rim of the selected cup.

10. A juicing assembly comprising:
a vessel having an interior;
a lid having a through-channel in fluid communication with the interior of the vessel when the lid is engaged with the vessel in a first orientation with respect to the vessel, the through-channel of the lid also being in fluid communication with the interior of the vessel when the lid is engaged with the vessel in a different second orientation with respect to the vessel; and
a citrus reamer removably couplable to the lid in a storage orientation with respect to the lid, the citrus reamer also being removably couplable to the lid in a different use orientation with respect to the lid, the citrus reamer having a reaming projection and at least one through-hole, the at least one through-hole being in fluid communication with the through-channel when the citrus reamer is coupled to the lid in the use orientation, the reaming projection being configured to have a citrus fruit pressed thereagainst to produce citrus juice when the citrus reamer is coupled to the lid in the use orientation and the lid is engaged with the vessel in the first orientation, the at least one through-hole allowing the citrus juice to flow into the through-channel of the lid, the citrus juice flowing through the through-channel of the lid and into the interior of the vessel the interior storing the citrus juice.

11. The juicing assembly of claim 10, wherein the lid is disengaged and spaced apart from the vessel and rotated to transition the lid from a selected one of the first and second orientations to a different one of the first and second orientations.

12. The juicing assembly of claim 10, wherein the citrus reamer is decoupled and spaced apart from the lid and rotated to transition the citrus reamer from a selected one of the storage and use orientations to a different one of the storage and use orientations.

13. The juicing assembly of claim 10, wherein the lid is configured to be disengaged from the vessel after the citrus juice has been produced,
the citrus reamer is configured to be decoupled from the lid after the citrus juice has been produced,
the vessel has an opening into the interior configured to receive one or more ingredients into the interior of the vessel, the lid is configured to be reengaged with the vessel in the second orientation, and the juicing assembly further comprises a cap configured to be attached to the lid to cover the through-channel when the lid is engaged with the vessel in the second orientation, the vessel, the lid, and the cap being shakable together as a unit when the citrus juice is inside the interior of the vessel to mix the citrus juice and the one or more ingredients together.

14. The juicing assembly of claim 10, wherein the lid is configured to be disengaged from the vessel after the citrus juice has been produced, the citrus reamer is configured to be decoupled from the lid after the citrus juice has been produced, the citrus reamer is configured to be recoupled to the lid in the storage orientation, the lid is configured to be reengaged with the vessel in the second orientation when the citrus reamer is coupled with the lid in the storage orientation, and the juicing assembly further comprises a cap configured to be attached to the lid to cover the through-channel when the lid is engaged with the vessel in the second orientation, the vessel, the lid, the citrus reamer, and the cap being transportable together as a unit.

15. The juicing assembly of claim 10, wherein the vessel has an opening into the interior, the juicing assembly further comprises a plurality of cups configured to be placed inside the interior of the vessel through the opening, and removed therefrom through the opening, and the plurality of cups are trapped inside the interior of the vessel by the lid when the lid is reengaged with the vessel in the second orientation with the citrus reamer coupled thereto in the storage orientation.

16. The juicing assembly of claim 10, wherein the lid is engaged with the vessel in the first orientation by removably coupling the lid and the vessel together, the vessel has an opening into the interior defined by a rim, and the lid is engaged with the vessel in the second orientation by positioning the lid against the rim of the vessel.

17. The juicing assembly of claim 16, wherein the lid is removably coupled to the vessel using a bayonet style connection.

18. The juicing assembly of claim 10, wherein the citrus reamer is removably coupled to the lid in the use orientation by a bayonet style connection, and the citrus reamer is removably coupled to the lid in the storage orientation by the same bayonet style connection.

19. The juicing assembly of claim 10, wherein the lid has a strainer extending across the through-channel.

20. A method for use with a vessel, a lid, a citrus reamer, and a cap coupled together as an assembly, the method comprising:

dissembling the assembly by:
(a) decoupling the cap from the lid;
(b) separating a first subassembly from the vessel, the first subassembly comprising the citrus reamer coupled to the lid, the citrus reamer being coupled to the lid in either a storage orientation or a use orientation with respect to the lid in the first subassembly; and
(c) dissembling the first subassembly by decoupling the citrus reamer from the lid if the citrus reamer is coupled to the lid in the storage orientation within in the first subassembly;

adding at least one ingredient to the vessel;

assembling a juicing subassembly by:
(a) if the first subassembly was disassembled, reassembling the first subassembly with the citrus reamer in the use orientation with respect to the lid;
(b) positioning the lid in an inverted orientation with respect to the vessel; and
(c) placing the lid in the inverted orientation on the vessel with the citrus reamer coupled to the lid in the use orientation with respect to the lid;

reaming a citrus fruit on a reaming projection of the citrus reamer to produce citrus juice that flows through both the citrus reamer and the lid into an interior of the vessel;

disassembling the juicing subassembly by removing the lid from the vessel, and decoupling the citrus reamer from the lid;

assembling a cocktail shaker subassembly by:
(a) positioning the lid in an upright orientation with respect to the vessel;
(b) coupling the lid to the vessel in the upright orientation after the citrus reamer has been decoupled therefrom; and
(c) attaching the cap to the lid;

shaking the cocktail shaker subassembly to mix the citrus juice and the at least one ingredient together to form a mixture;

removing the cap from the lid; and pouring the mixture from the cocktail shaker subassembly.

21. The method of claim 20, further comprising disassembling the cocktail shaker subassembly by decoupling the lid from the vessel; and reassembling the assembly by (a) reassembling the first subassembly by coupling the citrus reamer to the lid in either the use orientation or the storage orientation with respect to the lid, (b) coupling the first subassembly to the vessel, and (c) coupling the cap to the lid.

22. The method of claim 21, for use with the assembly comprising a plurality of cups housed inside the vessel, wherein dissembling the assembly further comprises removing the plurality of cups from the vessel, and reassembling the assembly further comprises placing the plurality of cups inside the vessel before the first subassembly is coupled to the vessel.

23. The method of claim 22, wherein pouring the mixture from the cocktail shaker subassembly comprises pouring the mixture into at least one of the plurality of cups.

24. A method for use with a vessel, a lid, a citrus reamer, a cup, and a cap coupled together as an assembly, the method comprising:

dissembling the assembly by:
(a) decoupling the cap from the lid;
(b) separating a first subassembly from the vessel, the first subassembly comprising the citrus reamer coupled to the lid;
(c) removing the cup from the vessel; and
(d) dissembling the first subassembly by decoupling the citrus reamer from the lid;

adding at least one ingredient to the vessel;

placing the citrus reamer on the cup;

reaming a citrus fruit on a reaming projection of the citrus reamer to produce citrus juice that flows through the citrus reamer and into the cup;

removing the citrus reamer from the cup;

pouring the citrus juice from the cup into the vessel;

assembling a cocktail shaker subassembly by:
(a) positioning the lid in an upright orientation with respect to the vessel;
(b) coupling the lid to the vessel in the upright orientation after the citrus reamer has been decoupled therefrom; and
(c) attaching the cap to the lid;
shaking the cocktail shaker subassembly to mix the citrus juice and the at least one ingredient together to form a mixture;
removing the cap from the lid; and
pouring the mixture from the cocktail shaker subassembly.

25. A kit comprising:
a vessel having an interior and a rim portion that defines an opening into the interior, the interior being configured to house a fluid;
a lid having a through-channel and a strainer extending across the through-channel, the lid being positionable with respect to the vessel in both a first orientation and a different second orientation, the lid being removably couplable to the vessel when in the first orientation, the lid being configured to rest upon the rim portion of the vessel when in the second orientation, the through-channel being in fluid communication with the opening when the lid is coupled to the vessel, the strainer being operable, when the lid is coupled to the vessel, to strain the fluid as the fluid flows from the interior through the opening into the through-channel and through the strainer;
a citrus reamer removably couplable to the lid within the through-channel, the citrus reamer being removably couplable to the lid in both a storage orientation and a different use orientation with respect to the lid, the citrus reamer having a reaming projection that extends into the through-channel when the citrus reamer is in the storage orientation, the reaming projection extending outwardly from the through-channel beyond the lid when the citrus reamer is in the use orientation, a first one of the lid and the citrus reamer having a plurality of projections, a different second one of the lid and the citrus reamer having a plurality of channels, the plurality of projections being aligned with and inserted into the plurality of channels as the citrus reamer is at least partially inserted inside the through-channel in either the storage orientation or the use orientation, at least one of the lid and the citrus reamer being rotatable when the citrus reamer is at least partially inside the through-channel to move the plurality of projections through the plurality of channels to thereby removably couple the citrus reamer to the lid; and
a cap configured to be attached to the lid to cover the through-channel, (a) the vessel, the lid in the first orientation, the citrus reamer, and the cap being configured to be removably coupled together to form a kit assembly, the citrus reamer being coupled to the lid in either the storage orientation or the use orientation in the kit assembly, (b) the vessel, the lid in the first orientation, and the cap being configured to be removably coupled together to form a cocktail shaker, and (c) the vessel, the lid in the second orientation, and the citrus reamer being configured to be removably coupled together to form a juicing assembly, the citrus reamer being coupled to the lid in the use orientation in the juicing assembly.

26. The kit of claim 25, wherein the strainer is permanently attached to the lid inside the through-channel.

27. The kit of claim 25, wherein the cocktail shaker does not include the citrus reamer.

28. The kit of claim 25, wherein the plurality of projections is a the plurality of first projections,
the plurality of channels is a plurality of first channels,
a first one of the lid and the vessel has a plurality of second projections,
a different second one of the lid and the vessel has a plurality of second channels,
the lid in the first orientation is partially insertable into the opening to position the plurality of second projections inside the plurality of second channels, and
at least one of the lid and the vessel is rotatable when the lid is partially inserted into the opening to move the plurality of second projections through the plurality of second channels to thereby removably couple the lid to the vessel.

29. The kit of claim 25, wherein the plurality of projections is a the plurality of first projections,
the plurality of channels is a plurality of first channels,
a first one of the lid and the vessel has a plurality of second projections,
a different second one of the lid and the vessel has a plurality of second channels,
the lid in the first orientation is positionable with respect to the vessel to position the plurality of second projections inside the plurality of second channels, and
at least one of the lid and the vessel is rotatable to move the plurality of second projections through the plurality of second channels to thereby removably couple the lid to the vessel.

30. The kit of claim 25, further comprising:
a plurality of cups configured to be housed inside the interior of the vessel and to be removed from the interior of the vessel through the opening.

31. The kit of claim 30, wherein a selected one of the plurality of cups has a rim defining an opening into a cup interior,
the citrus reamer has at least one through-hole,
the citrus reamer is configured to rest upon the rim of the selected cup with the reaming projection extending upwardly away from the cup interior,
the reaming projection is configured to have a citrus fruit pressed thereagainst to produce citrus juice when the citrus reamer is resting upon the rim of the selected cup, and
the at least one through-hole allows the citrus juice to flow into the cup interior when the citrus reamer is resting upon the rim of the selected cup.

32. A kit comprising:
a vessel having an interior and a rim portion that defines an opening into the interior, the interior being configured to house a fluid;
a lid having a through-channel and a strainer extending across the through-channel, the lid being positionable with respect to the vessel in both a first orientation and a different second orientation, the lid being removably couplable to the vessel when in the first orientation, the lid being configured to rest upon the rim portion of the vessel when in the second orientation, the through-channel being in fluid communication with the opening when the lid is coupled to the vessel, the strainer being operable, when the lid is coupled to the vessel, to strain the fluid as the fluid flows from the interior through the opening into the through-channel and through the strainer, a first one of the lid and the vessel having a plurality of projections, a different second one of the lid and the vessel having a plurality of channels, the lid in the first orientation being positionable with respect to the vessel to position the plurality of projections inside the plurality of channels, and at least one of the lid and the vessel being rotatable to move the plurality of projections through the plurality of channels to thereby removably couple the lid to the vessel;

a citrus reamer removably couplable to the lid within the through-channel; and a cap configured to be attached to the lid to cover the through-channel, (a) the vessel, the lid in the first orientation, the citrus reamer, and the cap being configured to be removably coupled together to form a kit assembly, the vessel, (b) the lid in the first orientation, and the cap being configured to be removably coupled together to form a cocktail shaker, and (c) the vessel, the lid in the second orientation, and the citrus reamer being configured to be removably coupled together to form a juicing assembly.

33. The kit of claim 32, wherein the strainer is permanently attached to the lid inside the through-channel.

34. The kit of claim 32, wherein the cocktail shaker does not include the citrus reamer.

35. The kit of claim 32, wherein the citrus reamer is removably couplable to the lid in both a storage orientation and a different use orientation with respect to the lid, the citrus reamer is coupled to the lid in the use orientation in the juicing assembly, and the citrus reamer is coupled to the lid in either the storage orientation or the use orientation in the kit assembly.

36. The kit of claim 35, wherein the citrus reamer has a reaming projection that extends into the through-channel when the citrus reamer is in the storage orientation, and the reaming projection extends outwardly from the through-channel beyond the lid when the citrus reamer is in the use orientation.

37. The kit of claim 32, wherein positioning the plurality of projections inside the plurality of channels comprises partially inserting the lid in the first orientation into the opening of the vessel, and coupling the lid to the vessel comprises rotating at least one of the lid and the vessel while the lid is partially inserted into the opening, which moves the plurality of projections through the plurality of channels.

38. The kit of claim 32, further comprising:

a plurality of cups configured to be housed inside the interior of the vessel and to be removed from the interior of the vessel through the opening.

39. The kit of claim 38, wherein a selected one of the plurality of cups has a rim defining an opening into a cup interior, the citrus reamer has a reaming projection and at least one through-hole, the citrus reamer is configured to rest upon the rim of the selected cup with the reaming projection extending upwardly away from the cup interior, the reaming projection is configured to have a citrus fruit pressed thereagainst to produce citrus juice when the citrus reamer is resting upon the rim of the selected cup, and the at least one through-hole allows the citrus juice to flow into the cup interior when the citrus reamer is resting upon the rim of the selected cup.

* * * * *